US006177175B1

(12) United States Patent
Hashimoto

(10) Patent No.: US 6,177,175 B1
(45) Date of Patent: Jan. 23, 2001

(54) MAGNETO-OPTICAL MEDIUM UTILIZING DOMAIN WALL DISPLACEMENT

(75) Inventor: Morimi Hashimoto, Wako (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/172,872

(22) Filed: Oct. 15, 1998

(30) Foreign Application Priority Data

| Oct. 16, 1997 | (JP) | ................................................... 9-283580 |
| Oct. 22, 1997 | (JP) | ................................................... 9-289719 |
| Oct. 24, 1997 | (JP) | ................................................... 9-292648 |
| Oct. 13, 1998 | (JP) | ................................................. 10-290818 |
| Oct. 14, 1998 | (JP) | ................................................. 10-291940 |
| Oct. 14, 1998 | (JP) | ................................................. 10-292092 |

(51) Int. Cl.$^7$ ................................................... G11B 5/66
(52) U.S. Cl. ................................ 428/141; 428/694 ML; 428/694 SG; 428/900; 369/13
(58) Field of Search ................ 428/694 ML, 694 SG, 428/900, 141; 369/13

(56) References Cited

U.S. PATENT DOCUMENTS

| 4,756,967 | 7/1988 | Hashimoto et al. ................. 428/336 |
| 4,910,068 | 3/1990 | Takagi et al. ........................ 428/141 |
| 5,132,173 | 7/1992 | Hashimoto et al. ................. 428/336 |
| 5,427,833 | * 6/1995 | Nakayama ........................... 428/64.4 |
| 5,576,087 | * 11/1996 | Watanabe ............................ 428/141 |
| 5,580,633 | * 12/1996 | Kuwahara ........................... 428/64.3 |
| 5,962,154 | * 10/1999 | Hashimoto ................... 428/694 ML |
| 5,966,348 | * 10/1999 | Hashimoto .............................. 369/13 |

FOREIGN PATENT DOCUMENTS 6-290496   10/1994 (JP) .

OTHER PUBLICATIONS

Awano, et al., "Magnetic domain expansion readout for amplification of an ultra high density magneto–optical recording signal", Appl. Phys. Lett., vol. 69, No. 27, pp. 4257–4259, 1996.

* cited by examiner

Primary Examiner—Leszek Kiliman
(74) Attorney, Agent, or Firm—Fitzpatrick, Cella, Harper & Scinto

(57) ABSTRACT

Disclosed herein is a magneto-optical medium of the type that information recorded therein is reproduced by displacing a domain wall, the medium comprises a substrate, and a magnetic layer provided on the substrate, which permits domain wall displacement, wherein the surface roughness Ra of the substrate is 1.2 nm or smaller.

10 Claims, 14 Drawing Sheets

Ra 0.530 nm

Ra 0.530 nm

Ra 1.513 nm

Ra 0.825 nm

Ra 0.428 nm

Ra 1.104 nm

Ra 0.767 nm

MAGNETO-OPTICAL MEDIUM UTILIZING DOMAIN WALL DISPLACEMENT

BACKGROUND OF THE INVENTION

1. Field of the Invention

The present invention relates to a magneto-optical medium capable of ultrahigh-density recording, which utilizes domain wall displacement upon reproduction.

2. Related Background Art

In recent years, attention has been attracted to magneto-optical disks as rewritable high-density recording media, and there has been a strong demand for further enhancing the recording density of these magneto-optical media to provide them as recording media having a greater capacity. The linear recording density of an optical disk greatly depends on the laser wavelength and the numerical aperture NA of an objective lens of a reproducing optical system, and the detectable range of the spatial frequency upon reproduction of a signal is limited to about $NA/\lambda$. Therefore, for actually achieving higher recording density with a conventional optical disk, it is necessary to shorten the laser wavelength $\lambda$ or enlarge the numerical aperture NA of the objective lens in the reproducing optical system. However, the improvements in the laser wavelength $\lambda$ and the numerical aperture NA of the objective lens are limited naturally. Therefore, some techniques that the constitution and reading method of a recording medium are devises to improve the recording density have been proposed.

For example, in Japanese Patent Application Laid-Open No. 6-290496, the present applicant previously proposed a magneto-optical medium, a reproducing method and apparatus therefor, by which signals of frequency of less than the optical diffraction limit of an optical system can be reproduced at a high speed without decreasing the amplitude of reproduction signals. When a temperature distribution is formed on a displacement layer of a magneto-optical medium by a heating means such as a light beam, a distribution is formed in the domain wall energy density of the displacement layer as described in this publication. Therefore, a domain wall can be displaced momentarily in a direction low in domain wall energy. As a result, the amplitude of a reproduction signal always becomes fixed and maximum irrespective of the interval (i.e., the length of a record pit) between domain walls of a magnetic domain recorded. Namely, the inevitable reduction in reproduction output attendant on the improvement of linear recording density is greatly improved, so that still higher-density recording becomes feasible.

According to Japanese Patent Application Laid-Open No. 6-290496, the domain wall displacement is a phenomenon occurred in the same track (in a direction of the track), in which it is necessary that a magnetic layer be divided (i.e., magnetically separated among) into tracks. As a method for producing such open magnetic domains (divided domain walls), Japanese Patent Application Laid-Open No. 6-290496 proposes a method of using a rectangularly and deeply grooved substrate or a method of annealing groove portions of a substrate by irradiating them with a laser beam to magnetically modify them. However, the rectangularly and deeply grooved substrate has involved a problem of transferability that the bottom portions of rectangular grooves in a stamper cannot be finely transferred when transferring the pattern of the stamper upon stamping, and so the land portions of the substrate become a U-shaped section, resulting a failure to achieve a sufficient dividing effect. On the other hand, the annealing treatment requires to treat the substrate at a high temperature by irradiation of a laser beam of high power, or the like. The annealing by the laser beam of high power has involved a problem that since the area of portions deteriorated in magnetic property (modified in the magnetic layer) also spread outside tracks depending on the temperature distribution of the laser beam, the area of the magnetic layer, which can be substantially used as an information data division, is narrowed, and so a track density is decreased.

SUMMARY OF THE INVENTION

Accordingly, it is an object of the present invention to provide a magneto-optical medium of the domain wall displacement type, in which tracks are magnetically separated from each other without using the deep-groove formation or the annealing treatment.

Another object of the present invention is to provide a magneto-optical medium of the domain wall displacement type, by which domain wall displacement can be reproduced with good stability.

The above objects can be achieved by the present invention described below.

According to the present invention, there is thus provided a magneto-optical medium of the type that information recorded therein is reproduced by displacing a domain wall, the medium comprising:

a substrate, and a magnetic layer provided on the substrate, which permits domain wall displacement, wherein the surface roughness Ra of the substrate is 1.2 nm or smaller.

According to the present invention, there is also provided a magneto-optical medium of the type that information recorded therein is reproduced by displacing a domain wall, the medium comprising:

a substrate in which land portions and groove portions are alternately arranged, and a magnetic layer provided on the substrate, which permits domain wall displacement, wherein the surface roughness Ra of one of the land portions and the groove portions is 1.2 nm or greater.

DESCRIPTION OF THE PREFERRED EMBODIMENTS

The embodiments of the magneto-optical medium according to the present invention will hereinafter be described in detail with reference to the accompanying drawings.

First Embodiment

Figure 1:
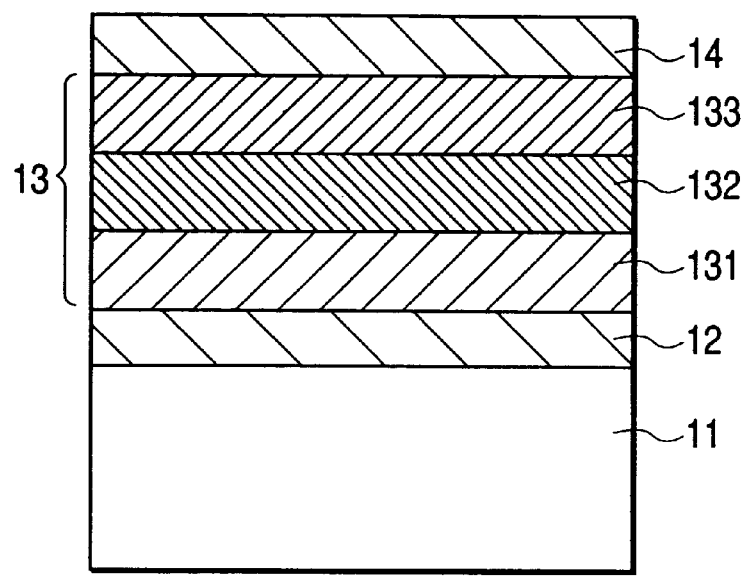
FIG. 1 is a typical cross-sectional view illustrating an example of the layer structure of a magneto-optical medium according to the first embodiment of the present invention.

FIG. 1 illustrates an example of the layer structure of a magneto-optical medium according to the first embodiment of the present invention. A first dielectric layer 12, a recording layer (magnetic layer) 13 and a second dielectric layer 14 are laminated in that order on a transparent substrate 11 to form the medium.

Examples of a material usable for the transparent substrate 11 include glass, polycarbonate, polymethyl methacrylate and thermoplastic norbornene resins.

The recording layer 13 may be either a single layer or a laminate without any particular limitation. However, this layer may be a magneto-optical information recording layer of the type that a magnetic domain is apparently enlarged for reproduction by displacing a domain wall upon the reproduction, for example, a layer comprised of a three-layer structure of a first magnetic layer 131, a second magnetic layer 132 and a third magnetic layer 133 as disclosed in Japanese Patent Application Laid-Open No. 6-290496. In this layer structure, the first magnetic layer 131 is a magnetic layer (displacement layer) relatively smaller in domain wall coercivity and greater in domain wall displaceability at a temperature close to ambient temperature compared with the third magnetic layer 133. The second magnetic layer 132 is a magnetic layer (switching layer) having a Curie temperature lower than the first magnetic layer 131 and the third magnetic layer 133. The third magnetic layer 133 is an ordinary magnetic recording layer (memory layer) excellent in storage stability of magnetic domains. In this case, the respective magnetic layers are exchange-coupled or magnetostatically coupled to one another by continuously forming the films by a physical vapor deposition process such as sputtering or vacuum deposition.

The first magnetic layer 131 is preferably comprised of, for example, a rare earth-iron group amorphous alloy such as GdCo, GdFe, GdFeCo or TbCo, which has comparatively small magnetic anisotropy, or a material for bubble memory, such as garnet.

The second magnetic layer 132 is preferably a magnetic layer comprised of, for example, a Co or Fe alloy, and having a Curie temperature lower than the first magnetic layer 131 and the third magnetic layer 133 and a saturation magnetization value smaller than the third magnetic layer 133. The Curie temperature may be adjusted by changing an amount of Co, Cr, Ti or the like added.

Third magnetic layer 133 is preferably comprised of, for example, a rare earth-iron group amorphous alloy such as TbFeCo, DyFeCo or TbDyFeCo, or a platinum group-iron group periodic structure film such as Pt/Co or Pd/Co, which has great saturation magnetization and magnetic anisotropy values and is capable of stably retaining a magnetization state (magnetic domains).

No particular limitation is imposed of the first and second dielectric layers 12 and 14. However, these layers are preferably comprised of, for example, SiN, $SiO_2$ or ZnS.

A heat-radiating layer comprised of an Al alloy or the like may be formed as needed.

The surface roughness of the substrate 11, which participates in reproduction, is substantially directly reflected in the surface roughness of the first magnetic layer 131. Accordingly, a direct and simple method for controlling the surface roughness of the first magnetic layer is to control the surface roughness of a surface of the substrate 11 on which surface the magnetic layer is formed.

The surface roughness of the substrate 11 is reflected in the surface roughness of a stamper in the case where the substrate is molded by injection molding. The stamper is produced in accordance with the following procedure. A glass master is first polished, and a resist is coated thereon. After the resist is cut and exposed in a desired way, development is conducted. An Ni film is then formed thereon by sputtering, and Ni electroforming is conducted. The film formed is then separated and washed to produce the stamper. Accordingly, the surface roughness of the resist surface is generally reflected in the surface roughness of the stamper. When cutting is conducted up to the glass master in a substrate for land & groove recording, however, the surface roughness of groove surfaces corresponds to the surface roughness of the glass master. In this case, the surface roughness of land surfaces corresponds to the surface roughness of the resist surface. When the groove surfaces are intended to use as land surfaces, it is only necessary to use the stamper thus produced as a mother to produce a reverse stamper. In any event, the surface roughness of the stamper can be controlled by the surface roughness of the resist surface or glass master.

As described above, it is effective for the injection molding of a plastic substrate to control the surface roughness of the stamper used for molding the substrate. Methods for controlling the surface roughness of the stamper include a method in which the surface roughness of the glass master used for the production of the stamper is controlled by a technique such as polishing, and a method in which the surface roughness of the resist surface is controlled by the material of the resist and the conditions of a process and the like.

The surface roughness of the first magnetic layer 131 which participates in reproduction, and surface roughnesses of other surfaces are expressed in terms of Ra (center line average height) measured by a scanning probe microscope. The surface roughness Ra of the substrate 11 is controlled to 1.2 nm or smaller, preferably 0.6 nm or smaller, whereby the surface roughness Ra of the first magnetic layer 131 and other magnetic layers, i.e., the magnetic layer 13, can also be controlled to 1.2 nm or smaller, preferably 0.6 nm or smaller.

When the magneto-optical medium having such a surface roughness is used, the phenomenon of domain wall displacement disclosed in Japanese Patent Application Laid-Open No. 6-290496 can be reproduced with good stability. This is considered to indicate that when the surface roughness (surface irregularities) of a magneto-optical medium is great, the domain wall displacement is prevented.

Figure 2:
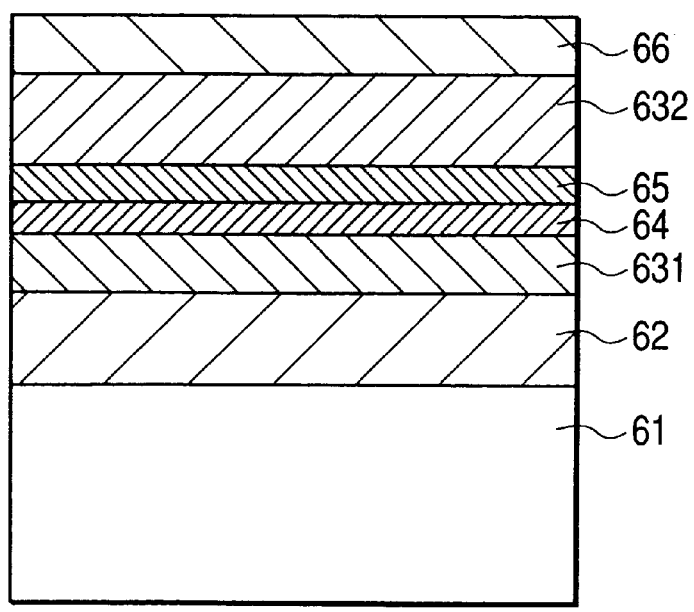
FIG. 2 is a typical cross-sectional view illustrating another example of the layer structure of a magneto-optical medium according to the first embodiment of the present invention.

FIG. 2 illustrates another example of the layer structure of a magneto-optical medium according to the first embodiment of the present invention. The magneto-optical medium of this example is of a type that a magnetic domain transferred to a displacement layer is enlarged/reduced by applying an external magnetic field as disclosed in, for example, Appl. Phys. Lett., Vol. 69, No. 27 (1996).

A first dielectric layer 62, the first magnetic layer 631, a second dielectric layer 64, a heat-radiating layer 65, a second magnetic layer 632 and a third dielectric layer 66 are laminated in that order on a transparent substrate 61 to form the medium.

The substrate 61 is comprised of the same material as that used for the above substrate 11, the first, second and third dielectric layers 62, 64, 66 are comprised of the same material as that used for the above dielectric layers 12, 14, the first magnetic layer 631 is comprised of the same material as that used for the above first magnetic layer 131, and the second magnetic layer 632 is comprised of the same material as that used for the above third magnetic layer 133. The first, second and third dielectric layers 62, 64, 66 function as a first interference layer, a second interference layer and a protective layer, respectively. The first magnetic layer 631 functions as a magnetic domain-enlarging layer and participates in reproduction. The second magnetic layer 632 functions as a memory layer.

As the heat-radiating layer 65, for example, an AlTi layer may be used. This heat-radiating layer 65 functions as a heat radiation adjusting layer for preventing the magneto-optical medium from being damaged by the temperature rising upon increase of reproduction power for enhancing reproduction sensitivity.

The surface roughness Ra of the first magnetic layer 631 which participates in reproduction is controlled to 1.2 nm or smaller, whereby the enlargement of an isolated magnetic domain by domain wall displacement can be reproduced with good stability. This is considered to indicate that when the surface roughness (surface irregularities) of a magneto-optical medium is too great, the domain wall displacement is prevented. In addition, the surface roughness Ra of the first magnetic layer 631 is controlled to 1.2 nm or smaller, whereby the enlargement of an isolated magnetic domain by domain wall displacement can be reproduced with good stability without applying any external magnetic field.

The first embodiment of the present invention will hereinafter be described in more detail by the following Examples. However, the present invention is not limited to these examples. Incidentally, in these examples, the surface roughness Ra was measured by means of a scanning probe microscope (SPM), "NanoScope III" (trade name, manufactured by Digital Instruments Co. in U.S.A.) using tapping mode AFM, and an ordinary blade tip as a probe.

EXAMPLE 1-1

A magneto-optical medium (magneto-optical disk) illustrated in FIG. 1 was produced.

Polycarbonate was used for a substrate 11. The polycarbonate substrate 11 is a substrate for land & groove recording with track pitch intervals of 0.5 $\mu$m.

Figure 3:
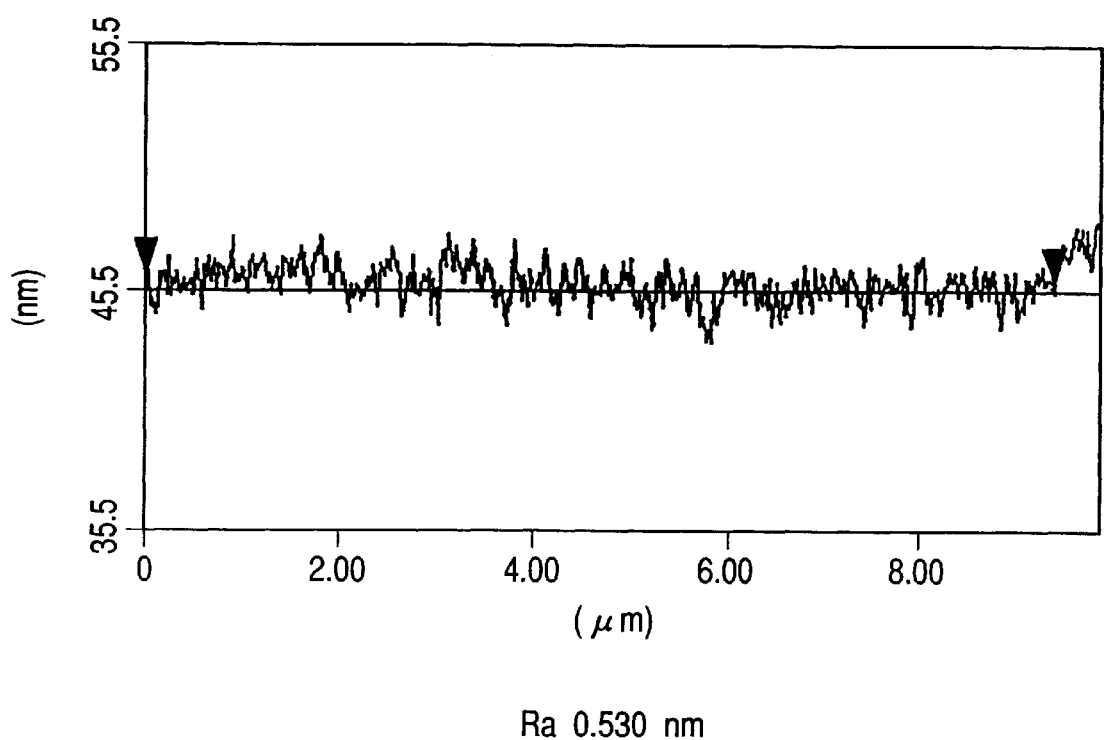
FIG. 3 diagrammatically illustrates the measurement result of the surface roughness of a substrate for a magneto-optical medium (Example 1-1) according to the present invention.

A glass master for producing the polycarbonate substrate 11 was polished to control the surface roughness Ra thereof to about 0.5 nm. The surface roughness Ra of convex portions (transferred as groove portions to the substrate) of a stamper made using this glass master was about 0.5 nm. The measurement result of the surface roughness Ra of the groove surfaces of the polycarbonate substrate 11 injection-molded using this stamper is shown in FIG. 3 (Ra 0.530 nm).

In FIGS. 3 to 8, an axis of abscissa indicates a distance ($\mu$m) from a point of a measuring plane, and an axis of ordinate indicates a detected height (nm) with the average value thereof expressed as a center line. The reason why the numerical values attached to a center line of the ordinate axis greatly differ among FIGS. 3 to 8 is that the measurement was conducted without initializing the initial value of the measuring apparatus. Accordingly, the numerical values themselves of the ordinate axis are meaningless, and a difference in height from the center line of the ordinate axis indicates the surface roughness.

An SiN layer 12 as an interference layer was formed in a thickness of 80 nm on the polycarbonate substrate 11. A GdFeCo layer 131 as a first magnetic layer (displacement layer) in a thickness of 30 nm, a DyFe layer 132 as a second magnetic layer (switching layer) in a thickness of 10 nm, and a TbFeCo layer 133 as a third magnetic layer (memory layer) in a thickness of 40 nm were then successively formed by sputtering. An SiN layer 14 as a protective layer was lastly formed in a thickness of 80 nm.

The whole land portion of the magnetic laminate layer 13 was then annealed by laser irradiation for the purpose of magnetically separating information tracks from one another.

The surface roughness of the groove portions (actually, the upper surface of the protective layer 14) of the magneto-optical medium thus obtained was measured. As a result, it was almost equal to the surface roughness of the groove portions of the substrate 11. Accordingly, the surface roughness of the displacement layer 131 may be said to be almost equal, also.

Continuous magnetic domains having a pit length of 0.10 $\mu$m were recorded on the magneto-optical disk thus obtained in a direction of track by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 39.5 dB was stably obtained with good reproducibility in an optical system (relative velocity: 2 m/s) having a wavelength of 635 nm and an NA of 0.6.

COMPARATIVE EXAMPLE 1-1

Figure 4:
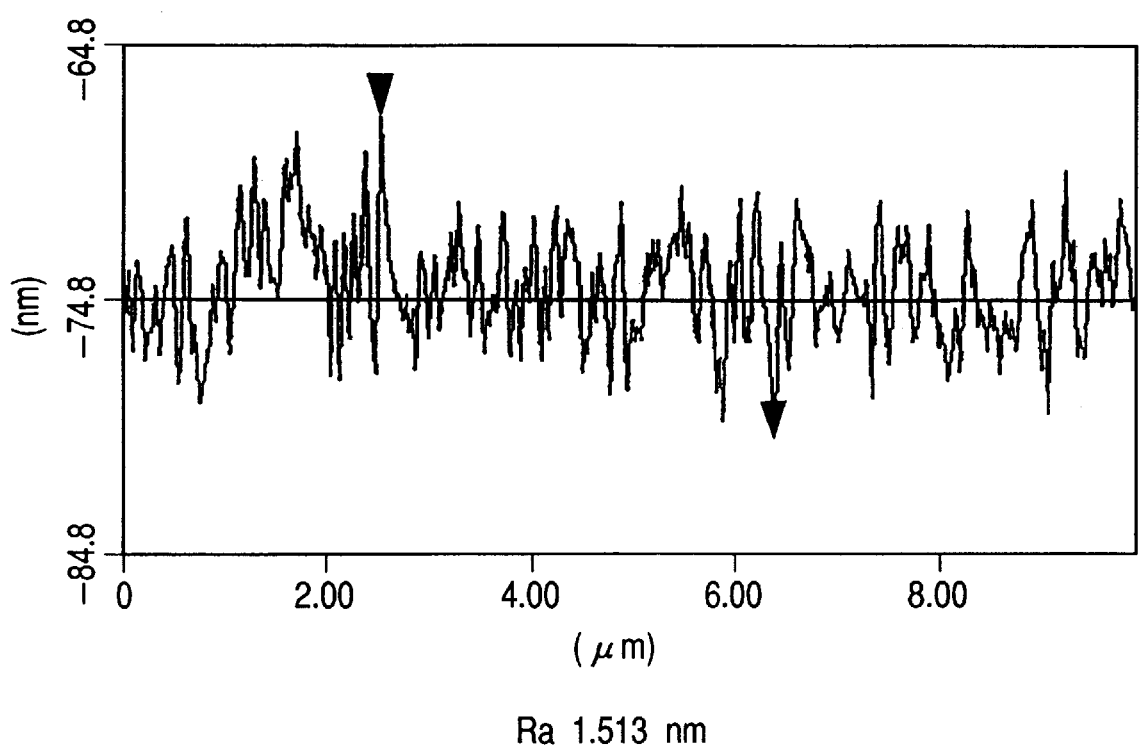
FIG. 4 diagrammatically illustrates the measurement result of the surface roughness of a substrate for magneto-optical media of Comparative Examples 1-1 and 1-2.

An experiment was conducted in the same manner as in Example 1-1 except that a substrate for an ordinary magneto-optical disk (3.5 inches, 230 MB) was used as the polycarbonate substrate. The surface roughness Ra of the polycarbonate substrate was 1.513 nm. The result thereof is shown in FIG. 4. Incidentally, the portions of the magnetic laminate layer corresponding to grooves were annealed by laser irradiation for the purpose of magnetically separating information tracks from one another like Example 1-1.

Continuous magnetic domains having a pit length of 0.10 μm were recorded on the magneto-optical disk thus obtained in a direction of track by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, no reproduction signal was obtained in an optical system (relative velocity: 2 m/s) having a wavelength of 635 nm and an NA of 0.6. Namely, the use of the substrate (Ra: 1.513 nm) of this comparative example made it impossible to reproduce a minute pit (0.10 μm) by domain wall displacement.

EXAMPLE 1-2

Figure 5:
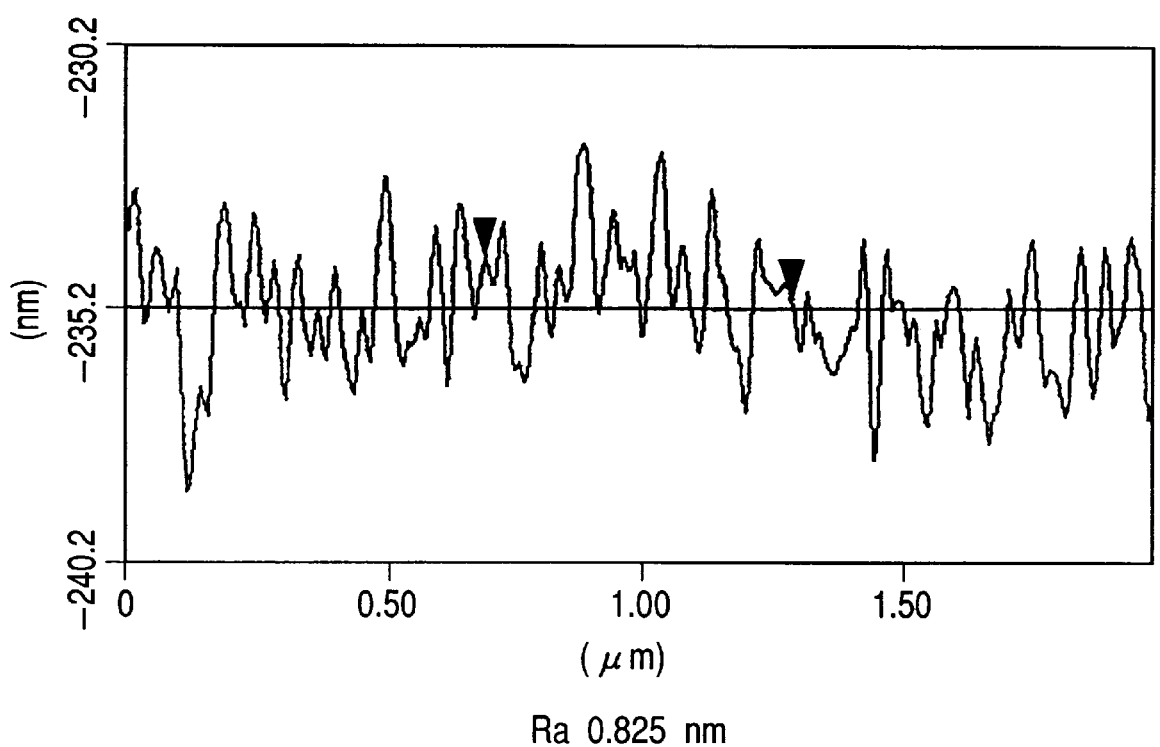
FIG. 5 diagrammatically illustrates the measurement result of the surface roughness of a substrate for a magneto-optical medium (Example 1-2) according to the present invention.

An experiment was conducted in the same manner as in Example 1-1 except that the surface roughness Ra of the groove surfaces of the polycarbonate substrate 11 was controlled to 0.825 nm. The measurement result of the surface roughness is shown in FIG. 5.

Continuous magnetic domains having a pit length of 0.10 μm were recorded on the magneto-optical disk thus obtained in a direction of track by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 38.0 dB was obtained in an optical system (relative velocity: 2 m/s) having a wavelength of 635 nm and an NA of 0.6. When compared with Example 1-1, however, the phenomenon of domain wall displacement did sometimes not occur (no reproduction signal was obtained) though very rare. Further, the C/N value was also reduced by 1.5 dB compared with Example 1-1. However, the medium was practicable without any problem.

EXAMPLE 1-3

Figure 6:
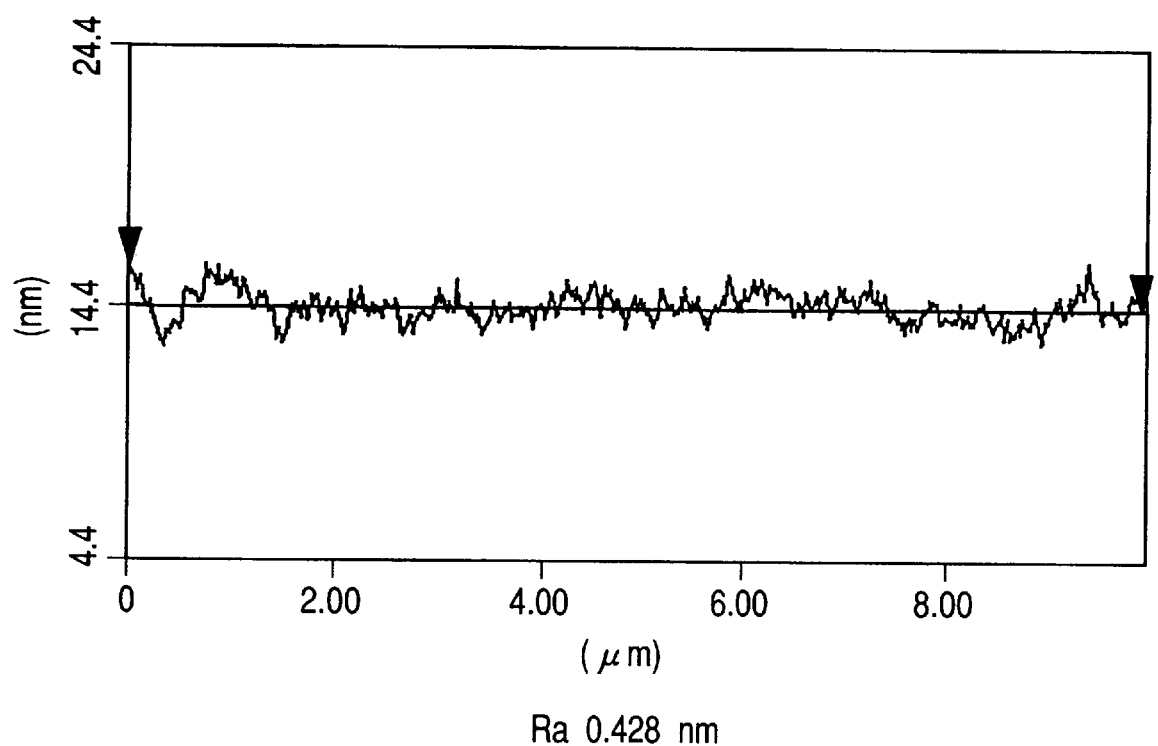
FIG. 6 diagrammatically illustrates the measurement result of the surface roughness of a substrate for a magneto-optical medium (Example 1-3) according to the present invention.

An experiment was conducted in the same manner as in Example 1-1 except that the surface roughness Ra of the groove surfaces of the polycarbonate substrate 11 was controlled to 0.428 nm. The measurement result of the surface roughness is shown in FIG. 6.

Continuous magnetic domains having a pit length of 0.10 μm were recorded on the magneto-optical disk thus obtained in a direction of track by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 40.0 dB was stably obtained with good reproducibility in an optical system (relative velocity: 2 m/s) having a wavelength of 635 nm and an NA of 0.6. When compared with Example 1-1, the C/N value was enhanced by 0.5 dB.

EXAMPLE 1-4

Figure 7:
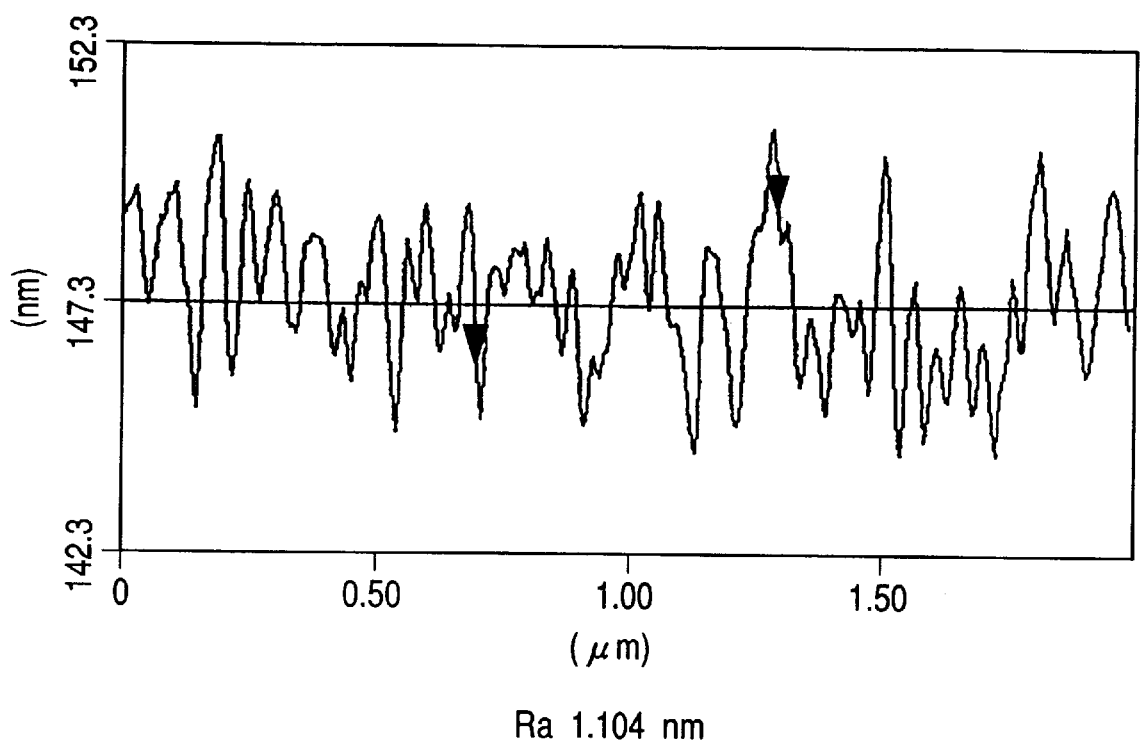
FIG. 7 diagrammatically illustrates the measurement result of the surface roughness of a substrate for a magneto-optical medium (Example 1-4) according to the present invention.

An experiment was conducted in the same manner as in Example 1-1 except that the surface roughness Ra of the groove surfaces of the polycarbonate substrate 11 was controlled to 1.104 nm, and the whole groove portion of the magnetic laminate layer was annealed by laser irradiation. The measurement result of the surface roughness is shown in FIG. 7.

Continuous magnetic domains having a pit length of 0.10 μm were recorded on the magneto-optical disk thus obtained in a direction of track by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 36.5 dB was obtained in an optical system (relative velocity: 2 m/s) having a wavelength of 635 nm and an NA of 0.6. When compared with Example 1-1, however, the phenomenon of domain wall displacement did sometimes not occur (no reproduction signal was obtained). Further, the C/N value was also reduced by 3.0 dB compared with Example 1-1. However, the medium was practicable without any problem.

EXAMPLE 1-5

A magneto-optical medium (magneto-optical disk) illustrated in FIG. 2 was produced.

Polycarbonate was used for a substrate 61. The polycarbonate substrate 61 is a substrate for land & groove recording with track pitch intervals of 0.5 μm.

Figure 8:
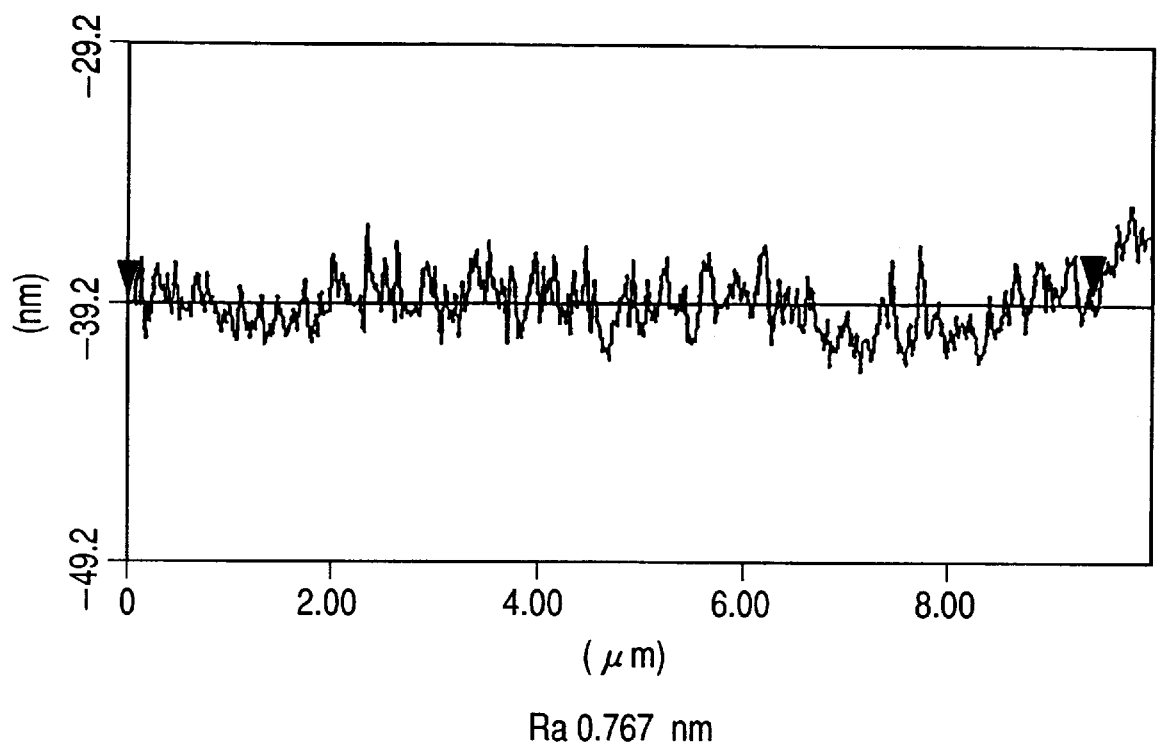
FIG. 8 diagrammatically illustrates the measurement result of the surface roughness of a substrate for a magneto-optical medium (Example 1-5) according to the present invention.

An SiN layer 62 as an first interference layer was formed in a thickness of 70 nm on the polycarbonate substrate 61 the surface roughness Ra of which was controlled to 0.767 nm. A GdFeCo layer 631 as a first magnetic layer (magnetic amplification layer) in a thickness of 20 nm, an SiN layer 64 as a second interference layer in a thickness of 15 nm, an AlTi layer 65 as a reflection layer in a thickness of 10 nm, a TbFeCo layer 632 as a second magnetic layer (memory layer) in a thickness of 200 nm, and lastly an SiN layer 66 as a protective layer in a thickness of 70 nm were then successively formed by sputtering. In this example, the annealing treatment of tracks for the purpose of dividing the magnetic layer by the tracks was not conducted. The measurement result of the surface roughness is shown in FIG. 8.

Isolated magnetic domains of 0.30 μm were recorded at intervals of 2.0 μm on the magneto-optical disk thus obtained by a magnetic field modulation system, and transferred/enlarged by applying an external supplementary magnetic field of about 50 Oe to the disk to reproduce them. As a result, reproduction signals of the practicable level were obtained in an optical system having a wavelength of 680 nm and an NA of 0.55.

COMPARATIVE EXAMPLE 1-2

An experiment was conducted in the same manner as in Example 1-5 except that the same substrate for an ordinary magneto-optical disk (3.5 inches, 230 MB) as that used in Comparative Example 1-1 was used as the polycarbonate substrate. The surface roughness Ra of the polycarbonate substrate was 1.513 nm.

Isolated magnetic domains of 0.30 μm were recorded at intervals of 2.0 μm on the magneto-optical disk thus obtained by a magnetic field modulation system, and transferred/enlarged by applying an external supplementary magnetic field of about 300 Oe to the disk to reproduce them. As a result, reproduction signals of the practicable level were obtained in an optical system having a wavelength of 680 nm and an NA of 0.55. However, when an external supplementary magnetic field of about 50 Oe was applied to the disk, no reproduction signal of the practicable level was obtained. Namely, the substrate (Ra: 1.513 nm) used in this comparative example requires to apply a strong external supplementary magnetic field for the reproduction.

EXAMPLE 1-6

An experiment was conducted in the same manner as in Example 1-5 except that the same substrate having a surface roughness Ra of 0.428 nm as that used in Example 1-3 was used as the polycarbonate substrate.

Isolated magnetic domains of 0.30 µm were recorded at intervals of 2.0 µm on the magneto-optical disk thus obtained by a magnetic field modulation system, and transferred/enlarged without applying any external supplementary magnetic field to reproduce them. As a result, reproduction signals of the practicable level were obtained in an optical system having a wavelength of 680 nm and an NA of 0.55. Namely, in the case of the substrate having a surface roughness Ra of 0.428 nm used in this example, the magnetic domains can be enlarged/reproduced with good results without applying any external supplementary magnetic field.

COMPARATIVE EXAMPLE 1-3

An experiment was conducted in the same manner as in Example 1-1 except that the surface roughness Ra of the land surfaces of the polycarbonate substrate was controlled to 1.315 nm, and the whole groove portion of the magnetic laminate layer was annealed by laser irradiation.

Continuous magnetic domains having a pit length of 0.10 µm were recorded on the magneto-optical disk thus obtained by a magnetic field modulation system, and reproduced using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, the reproduction signals were extremely small, and the C/N thereof was 35.0 dB in an optical system (relative velocity: 2 m/s) having a wavelength of 635 nm and an NA of 0.6. When compared with Example 1-1, the phenomenon of domain wall displacement did often not occur (no reproduction signal was obtained), and such a magneto-optical medium was lacking in stability.

From the above results, it was found that when the polycarbonate substrate having a surface roughness Ra of 1.315 nm is used, no reproduction signal of the practicable signal level was obtained by domain wall displacement.

According to the magneto-optical media according to the first embodiment of the present invention, as described above, the domain wall displacement can be reproduced with good stability by the Method of Enlarging/Reproducing Magnetic Domain by Domain Wall Displacement Utilizing Temperature Gradient. At the same time, the reproduction signals (C/N) can be enhanced.

According to the magneto-optical media according to the first embodiment, it is unnecessary to apply a strong external supplementary magnetic field or any external supplementary magnetic field upon reproduction, which has been necessary to the magneto-optical media of the type that reproduction is conducted by enlarging a magnetic domain.

In addition, since the "easiness of domain wall displacement" can be controlled by the simple method in which the same kind of a substrate for magneto-optical medium as those used heretofore is used to only control the surface roughness thereof, high-density magneto-optical media of the domain wall displacement type (including the type that the area of an isolated magnetic domain is enlarged by domain wall displacement) can be provided at low cost.

Second Embodiment

Figure 9:
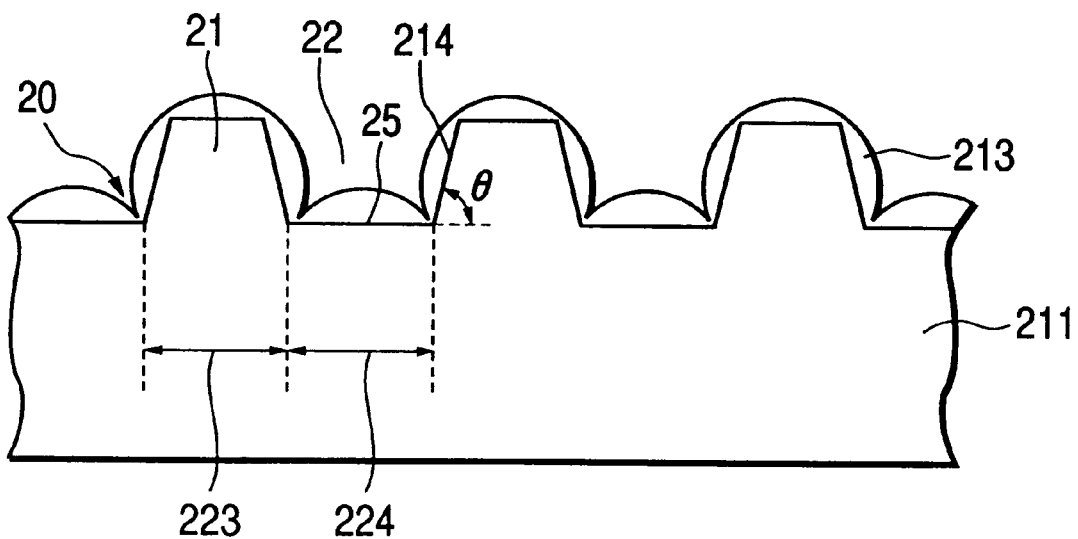
FIG. 9 is a typical cross-sectional view of a magneto-optical medium according to the second embodiment of the present invention.
Figure 10:
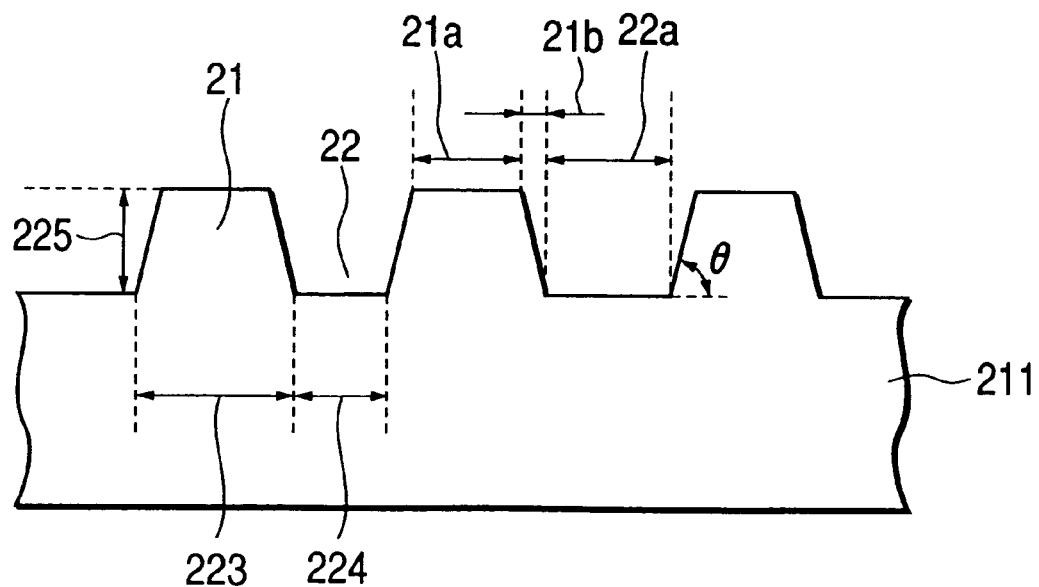
FIG. 10 is a typical cross-sectional view of a transparent substrate used for the magneto-optical medium illustrated in FIG. 9.

FIG. 9 typically illustrates a cross-section of a magneto-optical medium according to the second embodiment of the present invention taken perpendicularly to the recording direction. FIG. 10 illustrates only a transparent substrate of the magneto-optical medium shown in FIG. 9. Convex land portions 21 and concave groove portions 22 are formed in the surface of the transparent substrate 211 used in the second embodiment of the present invention. As illustrated in FIG. 9, the land portions each have a flat top and slanting sides 214, and the groove surface 25 is flat.

The angle θ of the slanting side 214 of the land portion is from 40 to 90 degrees. When the angle θ of the slanting side of the land portion is controlled to at least 40 degrees, a cut (discontinuous portion 20) is formed in a magnetic layer 213 at a boundary between the groove portion and the land portion when the magnetic layer 213 is deposited, so that the magnetic layer 213 is magnetically separated from each other, which can eliminate the necessity of conducting a special dividing treatment. The angle is preferably near to 90 degrees in order to magnetically dividing the magnetic layer with higher reliability, with 60 to 90 degrees being preferred.

From the viewpoint of higher-density recording, it is preferred that the widths 223 and 224 of the land portion 21 and the groove portion 22 be as narrow as possible. However, they require to have such a width that the influence of cross erase (erasing of a recorded domain on an adjacent track) and cross talk (mixing of a reproduction signal from an adjacent track) can be minimized and that a practicable reproduction signal can be obtained. Therefore, their widths are generally from 0.1 to 0.8 µm, preferably from 0.3 to 0.6 µm. A ratio of the land width 223 to the groove width 224 is preferably of the order of from 7:3 to 4:6. The height 225 of the land portion is preferably substantially equal to λ/(3 n) (wherein λ is a wavelength of light, and n is a natural number) at which the cross talk can be canceled. It is more preferred that the height be as high as possible for the purpose of developing the effect of magnetically dividing the magnetic layer. Therefore, the height is generally from 50 to 600 nm, preferably from 85 to 400 nm.

The investigation by the present inventors has revealed that when the surface roughness of each slanting side of the land portion is rough, reproduction by domain wall displacement is extremely hard to occur at the land portion even when a transparent substrate having such a form as described above is used. More specifically, since great irregularities of the surface interfere with the reproduction by domain wall displacement, the signal level of the reproduction by domain wall displacement thereof is extremely low though the reproduction takes place.

Thus, according to the second embodiment of the present invention, the surface roughness Ra of the transparent substrate at each slanting side 214 of the land portions is controlled to 1.2 nm or smaller, whereby the reproduction by domain wall displacement becomes feasible even at the land portions. It is preferred that the surface roughness at the slanting side 214 of the land portion be as small as possible. It is particularly preferably 0.6 nm or smaller.

It is also preferred that the surface roughnesses Ra of the top of each land portion and the surface of each groove portion be 1.2 nm or smaller, particularly 0.6 nm or smaller.

Figure 11:
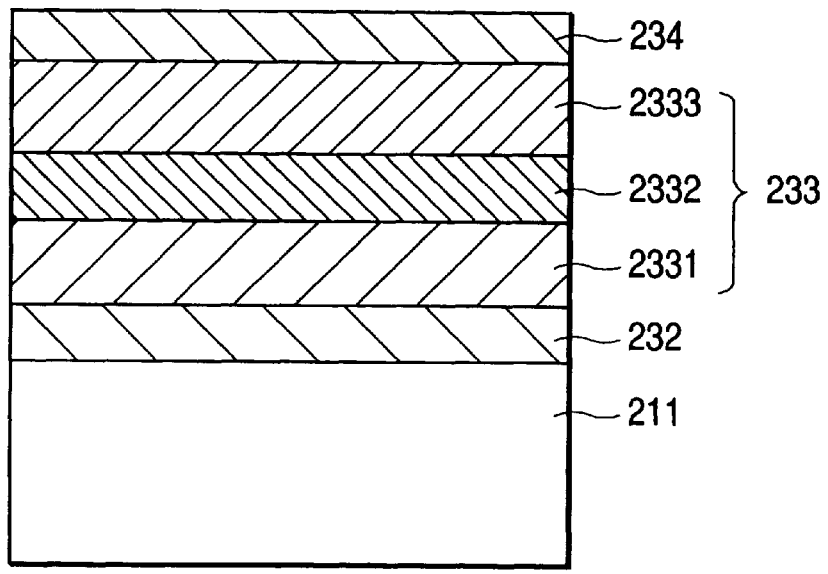
FIG. 11 is a cross-sectional view illustrating an example of the layer structure of the magneto-optical medium illustrated in FIG. 9.

An example of the layer structure of the magneto-optical medium according to the second embodiment of the present invention is illustrated in FIG. 11. A first dielectric layer 232, a magnetic layer 233 and a second dielectric layer 234 are laminated in this order on a transparent substrate 211 to form the medium.

Examples of a material usable for the transparent substrate include glass, polycarbonate, polymethyl methacrylate and thermoplastic norbornene resins.

No particular limitation is imposed on a molding process of the transparent substrate. However, injection molding is preferred for the purpose of mass-producing it. In this case, the surface roughness of a stamper is almost reflected in the surface roughness of the substrate. Therefore, the stamper is produced in such a manner that surfaces of the stamper corresponding to land portions and groove portions have such respective surface roughnesses as described above. Such a stamper is produced in accordance with the following procedure. A glass master is first polished, and a resist is coated thereon so as to give a coating thickness corresponding to the height 225 of the land portions. After the resist is heat-treated and exposed on the prescribed pattern to cut it (record), development is conducted to form a concave and convex pattern. In this case, a resist master in which the resist remains at portions corresponding to the land portions is formed.

An Ni film is then formed thereon by sputtering, and Ni electroforming is conducted. The film formed is then separated and washed to complete a stamper. When this stamper is used to mold a transparent substrate, the transparent substrate is provided in the same form as the patterned resist master. Accordingly, the surface roughnesses of the portions of the stamper corresponding to the tops and slanting sides of the land portions of the transparent substrate become a replica of the surface roughnesses of the tops and slanting sides of the resist, so that the surface roughness of the resist is directly reflected.

When this groove surfaces are intended to use as land surfaces, it is only necessary to use the stamper thus produced as a mother to produce a reverse stamper. In this case, the surface roughness of the stamper reflects the surface roughness of the glass master for the tops of the land portions, and the surface roughness of the resist surface for the sides of the land portions.

In order to control the surface roughness of the land portions, the surface roughness of the glass master is particularly important. It is therefore preferred to control the surface roughness Ra of the glass master to 1.2 nm or smaller, particularly preferably 0.6 nm or smaller.

Further, the substrate can be controlled to the prescribed surface roughness by optimizing the material and concentration of the resist, resist process (number of revolutions of a spindle of an apparatus for applying the resist, coating amount of resist, air feeding and discharging conditions, temperature, humidity, etc.) and exposing conditions to form a resist film which faithfully follows the surface of the glass master, and suitably adjusting the forming conditions of the Ni sputter film. In particular, the surface roughness Ra at the slanting sides can be controlled to 1.2 nm or smaller by adjusting the material and concentration (volatility) of the resist, exposing conditions and developing conditions. The angle θ of the slanting side may also be controlled by adjusting the same conditions as described above.

The memory layer 233 may be either a single layer or a laminate without any particular limitation. However, this layer may be a magnetic layer of the type that a magnetic domain can be apparently enlarged for reproduction by displacing a domain wall upon the reproduction.

For example, a magnetic layer comprised of a three-layer structure of a first magnetic layer, a second magnetic layer and a third magnetic layer as disclosed in Japanese Patent Application Laid-Open No. 6-290496 is used. In this layer structure, the first magnetic layer 2331 is a magnetic layer (displacement layer) relatively smaller in domain wall coercivity and greater in domain wall displaceability at a temperature close to ambient temperature compared with the third magnetic layer. The second magnetic layer 2332 is a magnetic layer (switching layer) having a Curie temperature lower than the first magnetic layer and the third magnetic layer. The third magnetic layer 2333 is an ordinary magnetic recording layer (memory layer) excellent in storage stability of magnetic domains. The respective magnetic layers are exchange-coupled to one another by continuously forming the films by a physical vapor deposition process such as sputtering or vacuum deposition.

The first magnetic layer is preferably comprised of, for example, a rare earth-iron group amorphous alloy such as GdCo, GdFe, GdFeCo, NdGdFeCo or TbFeCo, which has comparatively small perpendicular magnetic anisotropy, or a material for bubble memory, such as garnet.

The second magnetic layer is preferably a magnetic layer comprised of, for example, a Co alloy such as DyCo, TbCo, GdCo or GdFeCo, or an Fe alloy such as DyFe, GdFe or TbFe, and having a Curie temperature lower than the first magnetic layer 2331 and the third magnetic layer 2333 and a saturation magnetization value smaller than the third magnetic layer 2333. The Curie temperature may be adjusted by changing an amount of Co, Cr, Ti or the like added.

Third magnetic layer is preferably comprised of, for example, a rare earth-iron group amorphous alloy such as TbFeCo, DyFeCo, GdFeCo or TbDyFeCo, or a platinum group-iron group periodic structure film such as Pt/Co or Pd/Co, which has great saturation magnetization and magnetic anisotropy values and is capable of stably retaining a magnetization state (magnetic domains).

No particular limitation is imposed of the first and second dielectric layers 232, 234. However, these layers are preferably comprised of SiN, $SiO_2$, ZnS or the like.

A reflection film comprised of an Al alloy or the like may be formed on the second dielectric layer 234 as needed.

The present invention is most suitable for use in this kind of magnetic recording media in which a magnetic domain is enlarged and reproduced by domain wall displacement. Besides, the present invention may also be used for such a magnetic recording medium in which a magnetic domain is enlarged and reproduced by amplifying the magnetic domain as described in, for example, the Nov. 4, 1996, issue of Nikkei Electronics, p. 15.

Figure 15:
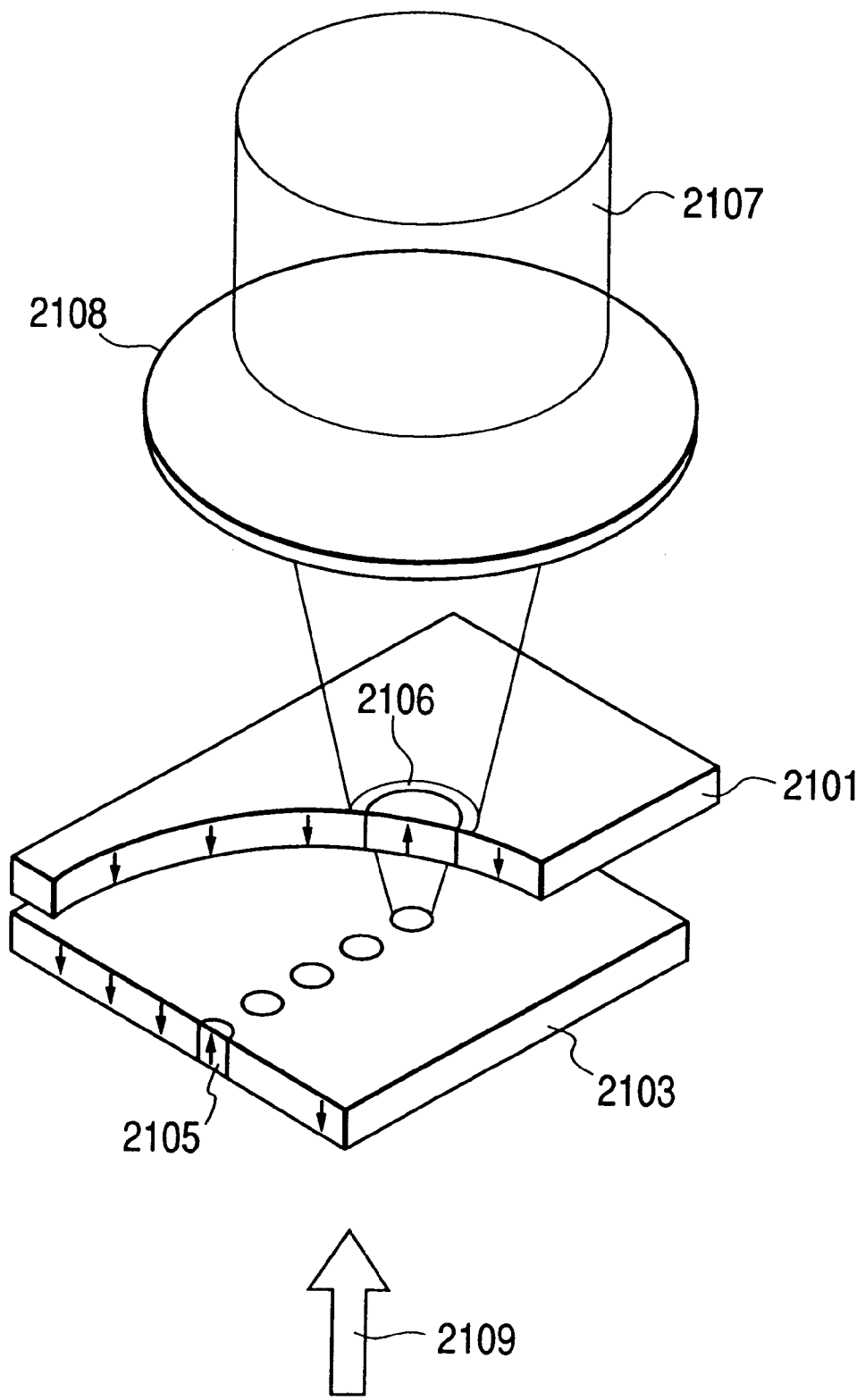
FIG. 15 illustrates a magneto-optical medium using a magnetic amplification layer, and a reproducing method therefor.

As illustrated in FIG. 15, this magnetic recording medium has at least a memory layer 2103 and a magnetic amplification layer 2101. In FIG. 15, reference numeral 2107 indicates a laser beam, 2108 an objective lens, and 2109 a direction of an external magnetic field. Recording is conducted by forming an upward or downward magnetic domain 2105 on the memory layer in a direction perpendicular to the medium plane by a magnetic field modulation-recording system or the like. Upon reproduction, a laser beam is projected on the magnetic amplification layer to heat it, whereby information on the memory layer, i.e., the direction of magnetization, is transferred to the magnetic amplification layer to form an amplified and enlarged magnetic domain 2106. At this time, an external magnetic field may be applied to further enlarge the amplified magnetic domain 2106. Since the enlarged magnetic domain is read out upon the reproduction as described above, large reproduction signals can be taken out even when recording is conducted at a high density.

In this magnetic recording medium, a switching layer may be provided between the magnetic amplification layer and the memory layer.

The second embodiment of the present invention will hereinafter be described in more detail by the following Examples. However, the present invention is not limited to these examples so far as it falls within the scope of subject matter thereof.

The surface roughnesses of the transparent substrate 211 and the magnetic layer 233 were measured by means of a scanning probe microscope (SPM), "NanoScope III" (trade name, manufactured by Digital Instruments Co. in U.S.A.) using tapping mode AFM. An ordinary blade tip was used as a probe, and the surface roughness was expressed in terms of an Ra (center line average height) value.

Recording-Reproducing Method

Figure 13:
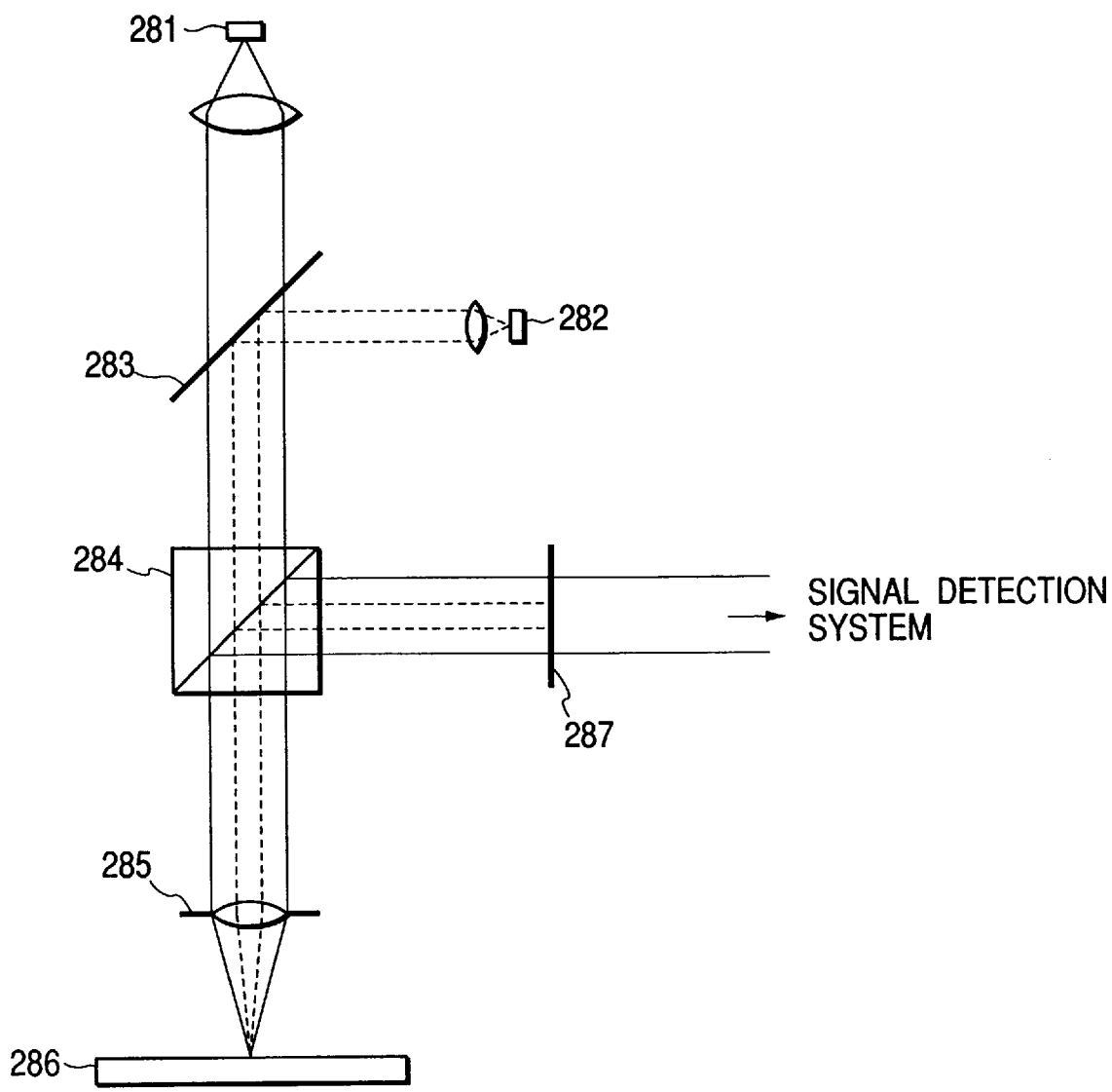
FIG. 13 illustrates a recording-reproducing apparatus used for the magneto-optical media according to the present invention.

As illustrated in FIG. 13, a recording-reproducing apparatus used for measurement comprises an optical system of a common recording-reproducing apparatus for magneto-optical disks, and a laser for heating added thereto. In FIG. 13, reference numeral 281 designates a source of a laser beam for record reproduction, the wavelength of which is 635 nm, and which is arranged in such a manner that rays emitted therefrom are incident in the form of P polarized light on a recording medium 286. Reference numeral 282 indicates a source of a laser beam for heating, the wavelength of which is 1.3 μm, and which is also arranged in such a manner that rays emitted therefrom are incident in the form of P polarized light on the recording medium. Reference numeral 283 designates a dichroic mirror designed to completely transmit light of 635 nm and completely reflect light of 1.3 μm. Reference numeral 284 indicates a polarized light beam splitter 18 designed to transmit 70 to 80% of P polarized light of both light of 635 nm and light of 1.3 μm, and completely reflect the S polarized light. The light flux of 1.3 μm is made smaller than the aperture diameter of an objective lens 285 to make the NA smaller than that of the light of 635 nm which is condensed through the entire area of the aperture. Reference numeral 287 designates a dichroic mirror provided for preventing the light of 1.3 μm from leaking out to a signal detection system and designed to completely transmit light of 635 nm and completely reflect light of 1.3 μm.

Figure 14A:
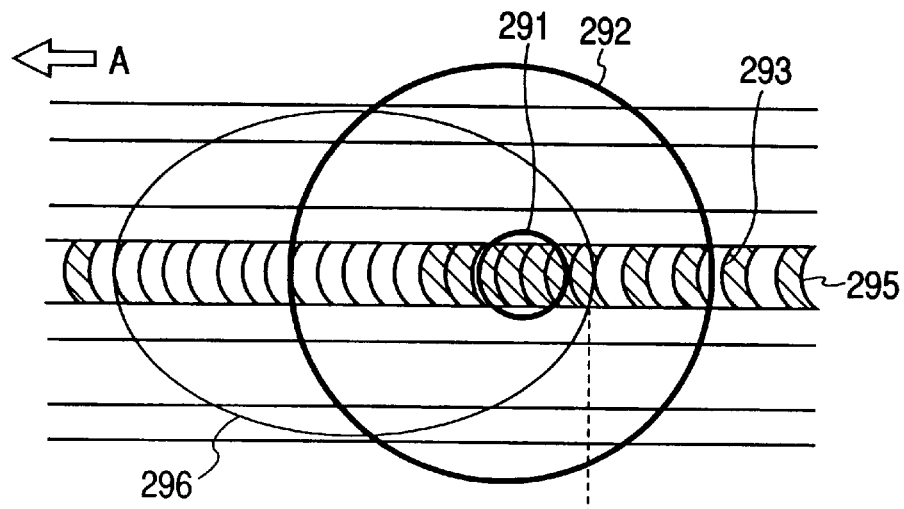
FIGS. 14A and 14B illustrate a reproducing state in the present invention.
Figure 14B:
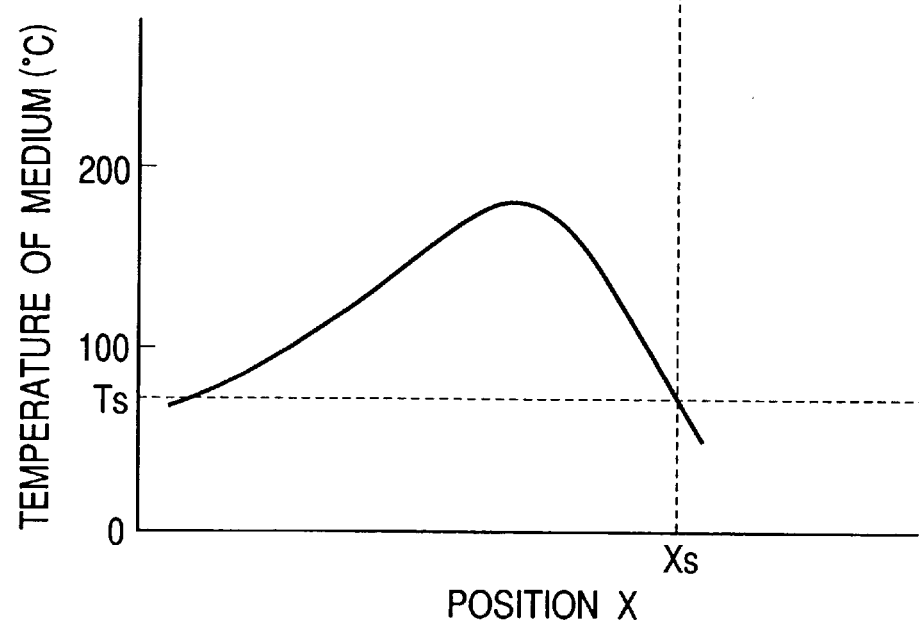

By this optical system, a recording-reproducing spot 291 and a heating spot 292 can be focused on a record track 295 on a recording surface of the recording medium 286 as illustrated in FIG. 14A. In FIG. 14A, an arrow A indicates a moving direction of the medium. The heating spot 292 is formed with a longer wavelength and a smaller NA and hence has a greater diameter than that of the recording-reproducing spot 291, whereby such a desired temperature gradient as illustrated in FIG. 14B can be easily produced in the region of the recording-reproducing spot 291 on the recording surface of the moving medium. In FIG. 14A, reference numeral 296 indicates an isotherm of a temperature Ts.

A magnetic field is modulated at ±150 [Oe] while irradiating the medium with a DC laser light beam of 8 mW for record reproduction, thereby forming a pattern of repeated upward magnetization and downward magnetization corresponding to the modulation of the magnetic field in the course of cooling after heating the medium at a temperature higher than the Curie temperature of the third magnetic layer. At this time, the laser beam for heating may be projected together to reduce the recording power of the laser beam for record reproduction.

The modulation frequency of the recording magnetic field was varied from 1 to 10 MHz to conduct recording at the prescribed pit length and pit interval as indicated in each example.

The power of a laser beam for record reproduction upon reproduction was set to 1 mW to measure an C/N value as to the pattern of each mark length while simultaneously projecting a laser beam for heating at power of 20 mW. The temperature distribution on the medium surface at this time is as illustrated in FIG. 14B. The reproducing phenomenon in this case is the same as that described in Japanese Patent Application Laid-Open No. 6-290496, by which when the medium is moved, and the temperature of the medium is raised to Ts of the second magnetic layer, the exchange-coupling between the first and third magnetic layers is broken, and the domain wall 293 in the first magnetic layer is momentarily displaced to a region in which the temperature is higher and the domain wall energy density is lower. Therefore, the atomic spins of the first magnetic layer within the reproducing spot can be all aligned in one direction even when the length of a recorded domain is short, and the amplitude of a reproduction signal always becomes fixed and maximum irrespective of the length of the recorded domain, so that signals of frequency of less than the optical diffraction limit of an optical system can be reproduced.

EXAMPLE 2-1

As illustrated in FIG. 10, a transparent substrate 211 used in this example was such that polycarbonate is used as a material, a land width 223 is 0.6 μm, a groove width 224 is 0.4 μm, an angle θ of each slanting side of a land portion is 70 degrees, and a height 225 of the land portion is 280 nm.

In order to produce such a transparent substrate, a quartz glass master the surface of which was extremely smooth was used, and an Ar laser having a wavelength of 351 nm was used for cutting.

The surface roughness Ra of the transparent substrate 211 was measured. As a result, it was 0.825 nm at the top 21a of the land portion, 1.015 nm at the bottom 22a of the groove portion, and 0.825 nm at each slanting side 21b of the land portion.

As illustrated in FIG. 11, an SiN layer 232 as a first dielectric layer (interference layer) was formed in a thickness of 80 nm on the transparent substrate 211. A GdFeCo layer 2331 as a first magnetic layer (displacement layer) in a thickness of 30 nm, a DyFe layer 2332 as a second magnetic layer (switching layer) in a thickness of 10 nm, and a TbFeCo layer 2333 as a third magnetic layer (memory layer) in a thickness of 40 nm were then successively formed by sputtering. An SiN layer 234 as a second dielectric layer (protective layer) was lastly formed in a thickness of 80 nm.

The surface roughness of the magneto-optical disk thus obtained was substantially the same as that of the transparent substrate 211.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on "groove surfaces" of the magneto-optical disk thus obtained by an ordinary magnetic field modulation system, reproduction was conducted using the Method of Enlarging/Reproducing Magnetic Domain by Domain Wall Displacement as described above. As a result a C/N of 37.5 dB was obtained with good reproducibility in an optical system (relative velocity: 2 m/s) having a wavelength of 635 nm and an NA of 0.6.

Similarly, recording was continuously conducted at a pit length of 0.10 μm and a pit interval of 0.10 μm on "land surfaces" of the magneto-optical disk by the ordinary magnetic field modulation system, and reproduction was then conducted likewise. As a result, a C/N of 38.0 dB was obtained with good reproducibility in the optical system (relative velocity: 2 m/s) having a wavelength of 635 nm and an NA of 0.6.

According to the second embodiment of the present invention, as described above, the magnetic division of the magnetic layer by tracks is realized without conducting any annealing treatment, and domain wall displacement takes place in not only the groove portions but also the land portions. Therefore, a domain wall displacement type magneto-optical medium capable of recording on both lands and grooves has been able to be realized.

Since the above transparent substrate 211 can be formed with polycarbonate using a general-purpose substrate-forming technique, it is avoidable to increase the cost of the medium, and so the high-density recording medium can be provided at low cost.

COMPARATIVE EXAMPLE 2-1

A magneto-optical disk was produced in the same manner as in Example 2-1 except that a transparent substrate the surface roughness Ra of which was 1.513 nm at the slanting sides 214 of the land portions was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on "groove surfaces" of the magneto-optical disk thus obtained by an ordinary magnetic field modulation system, reproduction was conducted in the same manner as in Example 2-1. As a result, a C/N of 37.5 dB was obtained with good reproducibility in an optical system (relative velocity: 2 m/s) having a wavelength of 635 nm and an NA of 0.6.

On the other hand, recording was continuously conducted at a pit length of 0.10 μm and a pit interval of 0.10 μm also on "land surfaces" of the magneto-optical disk by the ordinary magnetic field modulation system, and reproduction was then conducted likewise. As a result, the reproduction signals were extremely small, and the C/N thereof was 27.0 dB in an optical system (relative velocity: 2 m/s) having a wavelength of 635 nm and an NA of 0.6.

From the above, it was found that when the surface roughness Ra of the land portions at the slanting sides is 1.513 nm, no reproduction signal of the practicable signal level was obtained on the land surfaces by domain wall displacement though the division of the magnetic layer is realized due to the rectangularly and deeply grooved transparent substrate.

EXAMPLE 2-2

A transparent substrate was produced in the same manner as in Example 2-1 except that the resist process (mainly, the viscosity, vaporization rate and coating thickness of the resist), exposing conditions and developing conditions for forming the stamper, which formed the basis of the formation of the transparent substrate in Example 2-1, was changed. The surface roughness Ra of the transparent substrate was 0.530 nm at both top 21a and slanting sides 21b of the land portion, and 0.767 nm at the surface 22a of the groove portion. A magneto-optical disk was produced in the same manner as in Example 2-1 except that this transparent substrate was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on "groove surfaces" of the magneto-optical disk thus obtained by an ordinary magnetic field modulation system, reproduction was conducted using the above-described reproducing method. As a result, a C/N of 38.5 dB was obtained with good reproducibility in an optical system (relative velocity: 2 m/s) having a wavelength of 635 nm and an NA of 0.6.

On the other hand, recording was continuously conducted at a pit length of 0.10 μm and a pit interval of 0.10 μm also on "land surfaces" of the magneto-optical disk by the ordinary magnetic field modulation system, and reproduction was then conducted likewise. As a result, a C/N of 39.5 dB was obtained with good reproducibility in the optical system (relative velocity: 2 m/s) having a wavelength of 635 nm and an NA of 0.6.

As apparent from the comparison of the results of the reproduction signals with those of Example 2-1, the C/N value is further enhanced because the surface roughness at the land portions and the groove portions is improved.

EXAMPLE 2-3

A transparent substrate 211 used in this example is such that polycarbonate is used as a material, a land width 223 is 0.6 μm, a groove width 224 is 0.4 μm, an angle θ of each slanting side of a land portion is 45 degrees, and a height 225 of the land portion is 85 nm.

Such a transparent substrate was produced in the same manner as in Example 2-2 except that the depth of the stamper was changed upon the formation of the stamper.

The surface roughness Ra of the transparent polycarbonate substrate 211 was measured. As a result, it was 0.530 nm at the top 21a of the land portion, 0.767 nm at the bottom 22a of the groove portion, and 0.530 nm at each slanting side 21b of the land portion.

Figure 12:
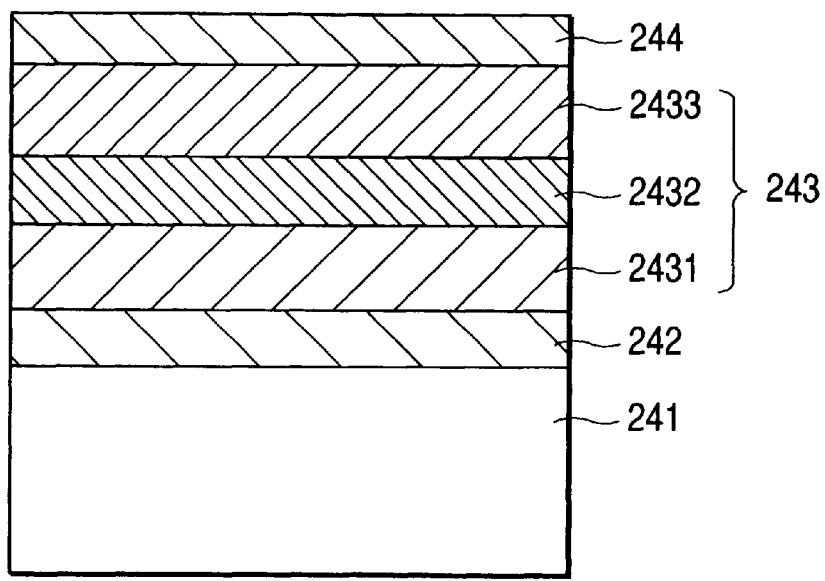
FIG. 12 is a cross-sectional view illustrating another example of the layer structure of the magneto-optical medium illustrated in FIG. 9.

A layer structure used in this example was a structure using a magnetic amplification layer. As illustrated in FIG. 12, an SiN layer 242 as a first dielectric layer (interference layer) was formed in a thickness of 70 nm on the transparent substrate 241 by sputtering. A GdFeCo layer 2431 as a first magnetic layer (magnetic amplification layer) in a thickness of 100 nm, a GdFeCo layer 2432 as a second magnetic layer (switching layer) in a thickness of 100 nm, and a TbFeCo layer 2433 as a third magnetic layer (memory layer) in a thickness of 50 nm were then successively formed by sputtering. An SiN layer 244 as a second dielectric layer (protective layer) was lastly formed in a thickness of 80 nm by sputtering.

Isolated magnetic domains of 0.30 μm were recorded at intervals of 2.0 μm on the magneto-optical disk thus obtained by a magnetic field modulation system, and reproduced in the same manner as in Example 2-1. As a result, reproduction signals of the practicable level were obtained in an optical system having a wavelength of 635 nm and an NA of 0.55.

COMPARATIVE EXAMPLE 2-2

A magneto-optical disk was produced in the same manner as in Example 2-3 except that a transparent substrate the surface roughness Ra of which was 1.513 at the slanting sides 21b of the land portions was used.

Isolated magnetic domains of 0.30 μm were recorded at intervals of 2.0 μm on the magneto-optical disk thus obtained by a magnetic field modulation system, and reproduced in the same manner as in Example 2-1 except that an external supplementary magnetic field of about 300 Oe was applied. As a result, reproduction signals of the practicable level were obtained in an optical system having a wavelength of 635 nm and an NA of 0.55. However, no reproduction signal was obtained when any external supplementary magnetic field was not applied.

As apparent from the above results, it is understood that the reproduction by domain wall displacement requires to apply some external supplementary magnetic field when the surface roughness Ra of the transparent substrate at the slanting sides 21b is 1.513 nm, whereas any external supplementary magnetic field is unnecessary to the reproduction when the surface roughness Ra of the transparent substrate at the slanting sides 21b is 1.2 nm or smaller.

EXAMPLE 2-4

A transparent substrate (land & groove form; 0.5 μm/05 μm) 211 was produced in the same manner as in Example 2-1 except that the resist process (mainly, the viscosity, vaporization rate and coating thickness of resist) for forming the stamper, which formed the basis of the formation of the transparent substrate, was adjusted to control the surface roughness Ra of the transparent substrate to 1.150 nm at both top 21a and slanting sides 21b of the land portion, and 0.767 nm at the surface 22a of the groove portion. A magneto-optical disk was produced in the same manner as in Example 2-1 except that this transparent substrate 211 was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on "groove surfaces" of the magneto-optical disk thus obtained by an ordinary magnetic field modulation system, reproduction was conducted using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 38.5 dB was obtained with good reproducibility in an optical system (relative velocity: 2 m/s) having a wavelength of 635 nm and an NA of 0.6.

On the other hand, recording was continuously conducted at a pit length of 0.10 μm and a pit interval of 0.10 μm also on "land surfaces" of the magneto-optical disk by the ordinary magnetic field modulation system, and reproduction was then conducted using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 37.0 dB was obtained with good reproducibility in the optical system (relative velocity: 2 m/s) having a wavelength of 635 nm and an NA of 0.6. As apparent from the comparison of the results of the reproduction signals with those of Example 2-1, the C/N value is somewhat deteriorated because the surface roughness at the land portions is comparatively great. However, the medium involves no practical problem.

As described above, the magnetic division of the magnetic layer by tracks is realized by using the rectangularly grooved transparent substrate 211 without conducting any annealing treatment, and the phenomenon of domain wall displacement takes place in not only "the groove portions" but also "the land portions". Therefore, a domain wall displacement type magneto-optical medium capable of recording on both lands and grooves has been able to be realized with ease. Since the above polycarbonate substrate 211 can be formed using a general-purpose substrate-forming technique, it is avoidable to increase the cost of the medium, and so the high-density recording medium can be provided at low cost.

COMPARATIVE EXAMPLE 2-3

A magneto-optical disk was produced in the same manner as in Example 2-4 except that a transparent substrate the surface roughness Ra of which was 1.305 at the slanting sides 21b of the land portions was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on "groove surfaces" of the magneto-optical disk thus obtained by an ordinary magnetic field modulation system, reproduction was conducted using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, a C/N of 38.5 dB was obtained with good reproducibility in an optical system (relative velocity: 2 m/s) having a wavelength of 635 nm and an NA of 0.6.

On the other hand, recording was continuously conducted at a pit length of 0.10 μm and a pit interval of 0.10 μm also on "land surfaces" of the magneto-optical disk by the ordinary magnetic field modulation system, and reproduction was then conducted using the "Method of Enlarging/Reproducing Magnetic Domain by Domain Wall Displacement Utilizing Temperature Gradient" (see Japanese Patent Application Laid-Open No. 6-290496) previously proposed by the present inventors. As a result, the reproduction signals were extremely small, and the C/N thereof was 35.0 dB in an optical system (relative velocity: 2 m/s) having a wavelength of 635 nm and an NA of 0.6.

As apparent from the results described above, it was found that when the surface roughness Ra of the polycarbonate substrate at the slanting sides 21b of the land portions is 1.305 nm, no reproduction signal of the practicable signal level was obtained on the land surfaces by domain wall displacement though the division of the magnetic layer is realized due to the rectangularly grooved substrate.

As described above, the magneto-optical media according to the second embodiment of the present invention can be produced with ease since any special treatment is not necessary for the magnetic division. In addition, since both groove portions and land portions can be used as recording surfaces, the track density is enhanced to permit higher-density recording. When such a magneto-optical medium is used, a domain wall can be momentarily displaced utilizing a temperature gradient to enlarge and reproduce a magnetic domain.

Third Embodiment

In order to magnetically dividing a magnetic layer by tracks, it is also effective to modify a portion of the magnetic layer in a dividing region from a perpendicular magnetization film into an in-plane magnetization film or a non-magnetic film. The present inventors have carried out an extensive investigation in view of this point. As a result, it has been found that the state of crystal growth of a magnetic layer to be formed varies according to the surface profile of a substrate on which the magnetic layer will be formed, i.e., the surface roughness of the substrate, and a magnetic layer becomes an in-plane magnetization film or a non-magnetic film when the magnetic layer is formed on a substrate having a surface roughness of 1.2 nm or greater.

The third embodiment of the present invention will hereinafter be described in detail with reference to the drawings.

Figure 16:
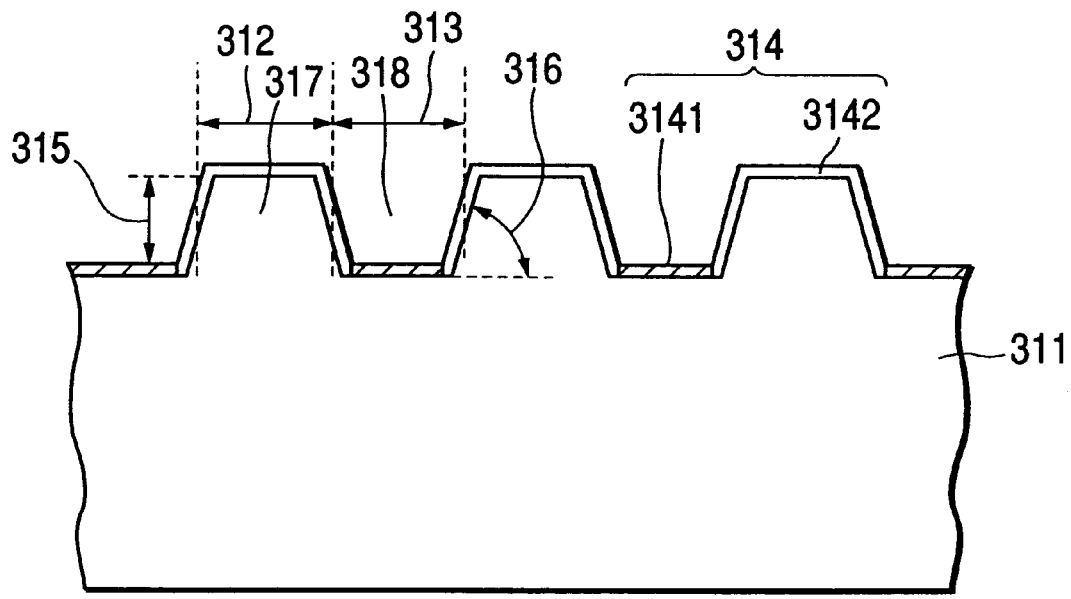
FIG. 16 is a typical cross-sectional view illustrating an example of the substrate form of a magneto-optical medium according to the third embodiment of the present invention.

FIG. 16 is a cross-sectional view illustrating an example of the magneto-optical medium according to the third embodiment of the present invention. A substrate 311 is formed from land portions (convex portions) 317 and groove portions (concave portions) 318. Ones (for example, the groove portions 318) of the land portions and the groove portions are regarded as tracks intended to magnetically divide a magnetic layer thereby. The surface roughness Ra of the tracks intended to magnetically divide the magnetic layer is controlled to 1.2 nm or greater, preferably 1.5 nm or greater, whereby the crystal growth state (i.e., magnetic property) of portions 3141 of a magnetic layer 314 formed thereon by sputtering can be caused to differ from other portions 3142 of the magnetic layer (changed to an in-plane magnetization film or a non-magnetic film), so that the magnetic layer 314 can be magnetically separated from each other.

By the way, the surface roughness Ra of the portions of the substrate not intended for the magnetic division is smaller than 1.2 nm, preferably 0.6 nm or smaller. A difference in the surface roughness of the substrate between the tracks intended for the magnetic division and ordinary data tracks is preferably 0.4 nm or greater, and the dividing effect is particularly marked when the difference is 1.0 nm or greater.

When the portions 3141 deteriorated in the magnetic property are annealed with a laser beam of low power, the dividing effect can be further enhanced.

No particular limitation is imposed on the width of each track. However, the width (in FIG. 16, the groove width 313) of the track intended for the magnetic division is preferably as narrow as possible from the viewpoint of increasing a track density.

No particular limitation is imposed of the forms of the land portions and the groove portions. They may take various forms, for example, such a rectangle as described in Japanese Patent Application Laid-Open No. 6-290496 and such a trapezoid as illustrated in FIG. 16.

The surface roughness of the substrate 311 reflects the surface roughness of a stamper in the case where the substrate is molded by injection molding.

The stamper is produced in accordance with the following procedure. A glass master is first polished, and a resist is coated thereon. After the resist is exposed in a desired way to cut it, development is conducted. An Ni film is then formed thereon by sputtering, and Ni electroforming is conducted. The film formed is then separated and washed to produce a stamper. Accordingly, the surface roughness of the stamper generally reflects the surface roughness of the resist surface. When cutting is conducted up to the glass master in a substrate for land & groove recording, however, the surface roughness of the goove surface corresponds to the surface roughness of the glass master.

As described above, the surface roughness of the stamper reflects the surface roughness of the resist surface or glass master. The resist surface can be controlled to a desired surface roughness by optimizing the material of the resist and a resist process, and the glass master can be controlled by its polishing or the like.

The surface roughness of the substrate 311 was measured by means of a scanning probe microscope (SPM), "Nano-Scope III" (trade name, manufactured by Digital Instruments Co. in U.S.A.) using tapping mode AFM. An ordinary blade tip was used as a probe, and the surface roughness was expressed in terms of an Ra (center line average height) value.

Figure 17:
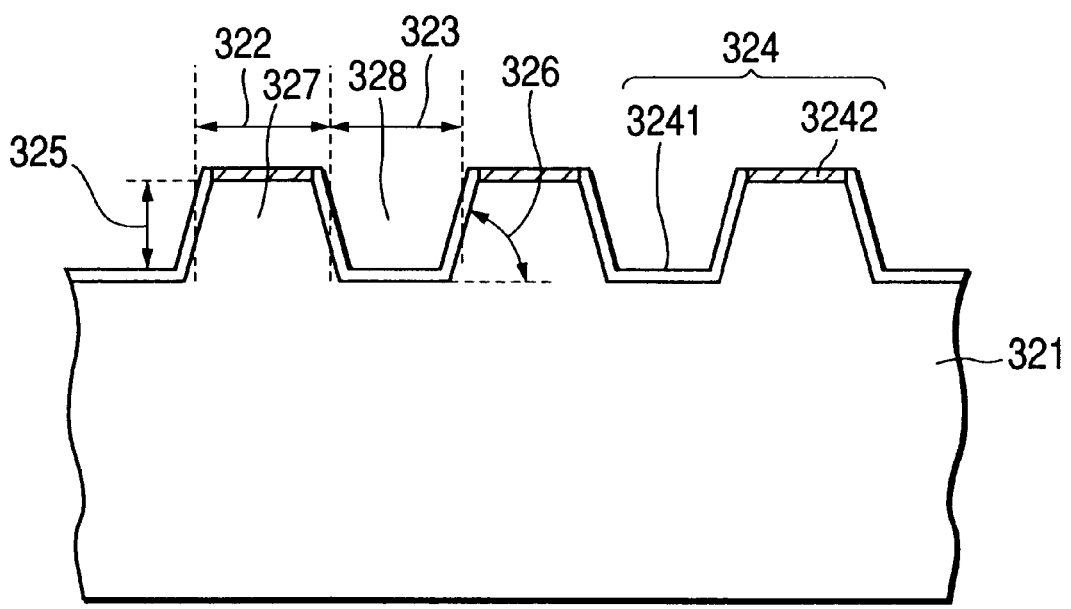
FIG. 17 is a typical cross-sectional view illustrating another example of the substrate form of a magneto-optical medium according to the third embodiment.

FIG. 17 is a typical cross-sectional view illustrating another example of the substrate form of the magneto-optical medium according to the third embodiment.

A substrate 321 is formed from land portions (convex portions) 327 and groove portions (concave portions) 328. The land portions are tracks intended to magnetically divide a magnetic layer thereby. The surface roughness Ra of such tracks is controlled to 1.2 nm or greater, preferably 1.5 nm or greater.

Figure 18:
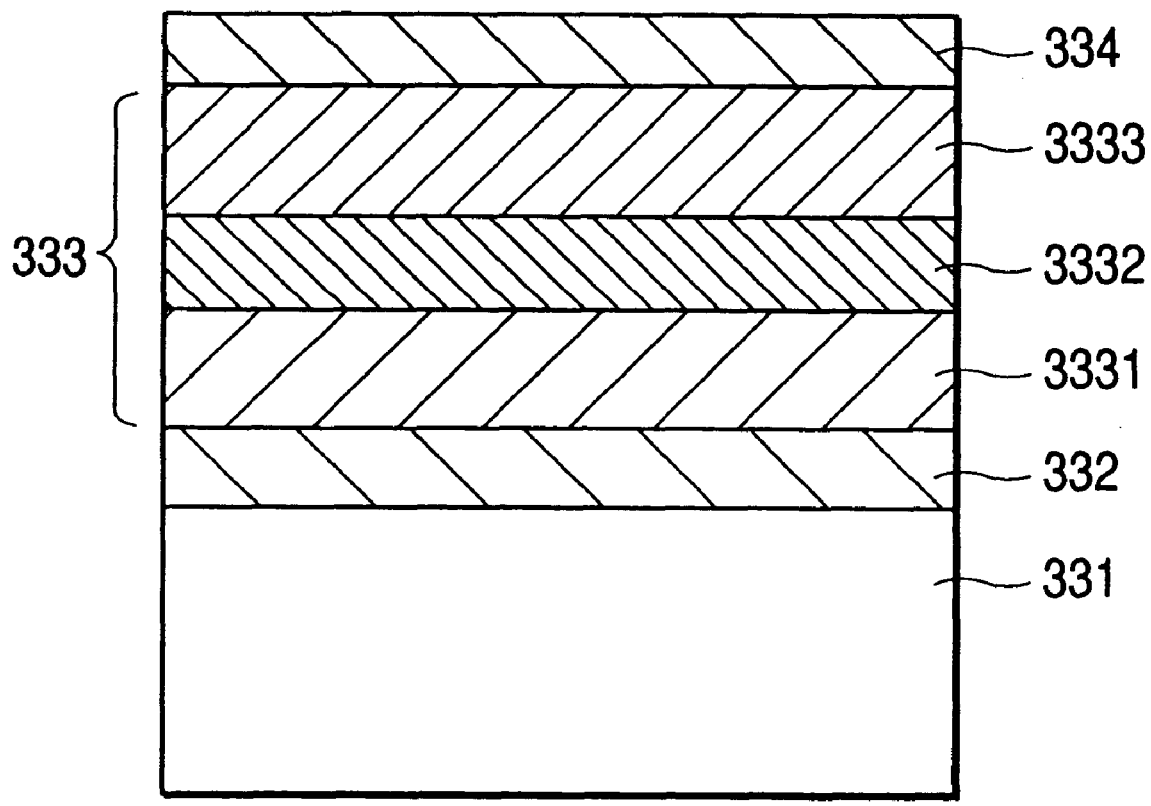
FIG. 18 is a cross-sectional view illustrating the layer structure of a magneto-optical medium according to the third embodiment.

FIG. 18 is a cross-sectional view illustrating the layer structure of the magneto-optical medium according to the third embodiment of the present invention. A first dielectric layer 332, a magnetic layer 333 and a second dielectric layer 334 are laminated in that order on a transparent substrate 331 to form the medium.

Examples of a material usable for the transparent substrate 331 include glass, polycarbonate, polymethyl methacrylate and thermoplastic norbornene resins.

The magnetic layer 333 may be either a single layer or a laminate without any particular limitation. However, this layer preferably has a layer structure disclosed in Japanese Patent Application Laid-Open No. 6-290496, in which at least first, second and third magnetic layers are successively laminated on the substrate. In this layer structure, the first magnetic layer 3331 is a magnetic layer (displacement layer) relatively smaller in domain wall coercivity and greater in domain wall displaceability at a temperature close to ambient temperature compared with the third magnetic layer 3333. The second magnetic layer 3332 is a magnetic layer (switching layer) having a Curie temperature lower than the first magnetic layer 3331 and the third magnetic layer 3333. The third magnetic layer 3333 is a magnetic recording layer (memory layer) excellent in storage stability of magnetic domains.

The respective magnetic layers are exchange-coupled or magnetostatically coupled to one another by continuously forming the films by a physical vapor deposition process such as sputtering or vacuum deposition.

The first magnetic layer 3331 is preferably comprised of, for example, a rare earth-iron group amorphous alloy such as GdCo, GdFe, GdFeCo or TbCo, which has comparatively small magnetic anisotropy, or a material for bubble memory, such as garnet.

The second magnetic layer 3332 is preferably a magnetic layer comprised of, for example, a Co or Fe alloy, and having a Curie temperature lower than the first magnetic layer 3331 and the third magnetic layer 3333 and a saturation magnetization value smaller than the third magnetic layer 3333. The Curie temperature may be adjusted by changing an amount of Co, Cr, Ti or the like added.

Third magnetic layer 3333 is preferably comprised of, for example, a rare earth-iron group amorphous alloy such as TbFeCo, DyFeCo or TbDyFeCo, or a platinum group-iron group periodic structure film such as Pt/Co or Pd/Co, which has great saturation magnetization and magnetic anisotropy values and is capable of stably retaining a magnetization state (magnetic domains).

No particular limitation is imposed of the first and second dielectric layers 332, 334. However, these layers are preferably comprised of, for example, SiN, $SiO_2$ or ZnS.

When the division of the magnetic layer by tracks is conducted by annealing the tracks intended to use for the division with a laser beam or the like after the formation of the magnetic layer in addition to the utilization of the difference in surface roughness of the substrate, the dividing effect can be enhanced. With respect to the conditions of the annealing, the dividing effect can be expected by a laser beam of low power or a narrow beam width since the magnetic layer is roughly magnetically divided in advance by the difference in surface roughness of the substrate. As a result, the area of the magnetic layer, which can be used as an information data division, is not narrowed compared with the case where the annealing is conducted with a laser beam of high power, and so the decrease in track density can be prevented. No particular limitation is imposed on an apparatus for the annealing. A laser used for record reproduction may be used as it is. A general-purpose cutting machine for optical disk may also be used.

The third embodiment of the present invention will hereinafter be described in more detail by the following Examples. However, the present invention is not limited to these examples so far as it falls within the scope of subject matter thereof.

EXAMPLE 3-1

FIG. 16 is a typical cross-sectional view illustrating an example of the substrate form of a magneto-optical medium according to the third embodiment of the present invention, and FIG. 18 is a cross-sectional view illustrating the layer structure of the magneto-optical medium according to the third embodiment.

In FIG. 16. a polycarbonate substrate 311 was a land & groove substrate that a land width 312 is 0.6 $\mu$m, a groove width 313 is 0.3 $\mu$m, a groove depth 315 is 85 nm, and a cone angle 316 is 45 degrees. The surface roughness Ra of the top of a land portion 317 of the substrate 311 was measured. As a result, it was 0.530 nm. The surface roughness Ra of the surface of a groove portion 318 was also measured. As a result, it was 1.513 nm.

As illustrated in FIG. 18, an SiN layer as a first dielectric layer (interference layer) 332 was formed in a thickness of 80 nm on the substrate 331 produced with the surface roughnesses of the land portions 317 and the groove portions 318 varied in the above-described manner. A GdFeCo layer as a first magnetic layer (displacement layer) 3331 in a thickness of 30 nm, a DyFe layer as a second magnetic layer (switching layer) 3332 in a thickness of 10 nm, and a TbFeCo layer as a third magnetic layer (memory layer) 3333 in a thickness of 40 nm were then successively formed by sputtering (The layers 3331, 3332 and 3333 are called collectively a magnetic layer 333). An SiN layer as a second dielectric layer (protective layer) 334 was lastly formed in a thickness of 80 nm.

After isolated magnetic domains of 0.2 $\mu$m were recorded on both land surfaces and groove surfaces of the magneto-optical disk thus obtained by a magnetic field modulation system, a light beam for heating was applied to the disk to observe the magnetic domains through a polarization microscope. As a result, open magnetic domains were observed in the land portions, but no magnetic domain was observed in the groove portions. It was thus confirmed that the groove portions were modified into film portions incapable of recording the isolated magnetic domain of 0.2 $\mu$m, and so the magnetic layer was magnetically divided by the groove portions.

After recording was continuously conducted at a pit length of 0.10 $\mu$m and a pit interval of 0.10 $\mu$m on the land surfaces of the magneto-optical disk thus obtained by an ordinary magnetic field modulation system, reproduction was conducted using the method described in Japanese Patent Application Laid-Open No. 6-290496, i.e., a method comprising projecting a light beam on the disk from the side of the first magnetic layer while relatively moving the light beam to the disk to form a temperature distribution having a gradient toward the moving direction of the spot on the disk; making the temperature distribution a temperature distribution having a temperature region at least higher than the Curie temperature of the second magnetic layer, thereby displacing a domain wall formed in the first magnetic layer; and detecting a change in the polarization direction of reflected light of the light beam to reproduce the recorded information (hereinafter referred to as the "Method of Enlarging/Reproducing Magnetic Domain by Domain Wall Displacement Utilizing Temperature Gradient of Magnetic Layer"). As a result, a C/N of 40.0 dB was obtained in an optical system (relative velocity: 2 m/s) having a wavelength of 680 nm and an NA of 0.6.

More specifically, when the polycarbonate substrate 311 of the above-described form was used, the magnetic layer was magnetically divided by tracks without conducting an annealing treatment or the like to easily realize the reproduction of the magneto-optical medium of the domain wall displacement type. Since such a polycarbonate substrate 311 can be formed using a general-purpose substrate-forming technique, it is avoidable to increase the cost of the medium, and so the high-density recording medium can be provided at low cost.

EXAMPLE 3-2

FIG. 17 is a typical cross-sectional view illustrating another example of the substrate form of a magneto-optical medium according to the third embodiment of the present invention, and FIG. 18 is a cross-sectional view illustrating the layer structure of the magneto-optical medium according to the third embodiment.

In FIG. 17, a polycarbonate substrate 321 was a land & groove substrate that a land width 322 is 0.3 $\mu$m, a groove width 323 is 0.6 $\mu$m, a groove depth 325 is 85 nm, and a cone angle 326 is about 70 degrees. The surface roughness Ra of the top of a land portion 327 of the substrate 321 was measured. As a result, it was 1.255 nm. The surface roughness Ra of the surface of a groove portion 328 was also measured. As a result, it was 0.825 nm.

As illustrated in FIG. 18, magnetic layers and dielectric layers were formed on the same polycarbonate substrate 341 as the above-described polycarbonate substrate 321 under the same conditions as in Example 3-1.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in the groove portions, but no magnetic domain was observed in the land portions. It was thus confirmed that the land portions were modified into film portions incapable of recording the isolated magnetic domain of 0.25 μm, and so the magnetic layer was magnetically divided by the land portions.

After recording was continuously conducted at a pit length of 0.10 μm and a pit interval of 0.10 μm on the groove surfaces of the magneto-optical disk thus obtained by an ordinary magnetic field modulation system, reproduction was conducted using the "Method of Enlarging/Reproducing Magnetic Domain by Domain Wall Displacement Utilizing Temperature Gradient of Magnetic Layer" like Example 3-1. As a result, a C/N of 39.0 dB was obtained in an optical system (relative velocity: 2 m/s) having a wavelength of 680 nm and an NA of 0.6.

More specifically, when the polycarbonate substrate 321 of the above-described form was used, the magnetic layer was magnetically divided by tracks without conducting an annealing treatment or the like to easily realize the reproduction of the magneto-optical medium of the domain wall displacement type. Since such a polycarbonate substrate 321 can be formed using a general-purpose substrate-forming technique, it is avoidable to increase the cost of the medium, and so the high-density recording medium can be provided at low cost.

COMPARATIVE EXAMPLE 3-1

An experiment was conducted in the same manner as in Example 3-1 except that a substrate the surface roughness Ra of the surfaces of the groove portions 318 of which was controlled to 0.825 nm was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on the land surfaces of the magneto-optical disk thus obtained by an ordinary magnetic field modulation system, reproduction was conducted using the "Method of Enlarging/Reproducing Magnetic Domain by Domain Wall Displacement Utilizing Temperature Gradient of Magnetic Layer" like Example 3-1. As a result, the reproduction signals were extremely small, and only a C/N of 24.0 dB was obtained in an optical system (relative velocity: 2 m/s) having a wavelength of 680 nm and an NA of 0.6.

A recording-reproducing experiment was also conducted on the groove surfaces under the same conditions as described above. As a result, the reproduction signals were similarly small, and only a C/N of 19.0 dB was obtained.

As described above, when the polycarbonate substrate of the above described form was used, the domain wall displacement was extremely hard to occur because the magnetic layer was not magnetically divided, and so no practicable reproduction signal was obtained.

EXAMPLE 3-3

An experiment was conducted in the same manner as in Example 3-2 except that only the land portions of the magneto-optical medium produced in Example 3-2 were annealed with a laser beam of low power. The annealing conditions was as follows. A laser having a wavelength of 680 nm and an NA of 0.6 is used, and a spot width and the power of a laser beam are controlled to 0.25 μm somewhat narrower than the land width, and 2 mW, respectively. By the way, the power of a laser beam required to magnetically dividing the magnetic layer by only annealing is from 8 to 10 mW at a wavelength of 680 nm, an NA of 0.6 and a spot diameter of about 1 μm.

After isolated magnetic domains of 0.2 μm were recorded on both land surfaces and groove surfaces of the magneto-optical disk thus obtained by a magnetic field modulation system, a light beam for heating was applied to the disk to observe the magnetic domains through a polarization microscope. As a result, open magnetic domains were observed in the groove portions, but no magnetic domain was observed in the land portions. It was thus confirmed that the land portions were modified into film portions incapable of recording the isolated magnetic domain of 0.2 μm, and so the magnetic layer was magnetically divided by the land portions.

After recording was continuously conducted at a pit length of 0.10 μm and a pit interval of 0.10 μm on the groove surfaces of the magneto-optical disk thus obtained by an ordinary magnetic field modulation system, reproduction was conducted using the "Method of Enlarging/Reproducing Magnetic Domain by Domain Wall Displacement Utilizing Temperature Gradient of Magnetic Layer" like Example 3-1. As a result, a C/N of 41.0 dB was obtained in an optical system (relative velocity: 2 m/s) having a wavelength of 680 nm and an NA of 0.6.

The reason why the C/N value was enhanced compared with Example 3-2 was that noise is reduced by the annealing treatment. Namely, the magneto-optical medium produced in Example 3-2 was annealed, whereby the magnetic division of the magnetic layer was more certainly made, and so a more preferred magneto-optical medium of the domain wall displacement type was provided.

EXAMPLE 3-4

An experiment was conducted in the same manner as in Example 3-1 except that a substrate the surface roughness Ra of the surfaces of the groove portions 318 of which was controlled to 1.315 nm was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in the land portions, but no magnetic domain was observed in the groove portions. It was thus confirmed that the groove portions were modified into film portions incapable of recording the isolated magnetic domain of 0.25 μm, and so the magnetic layer was magnetically divided by the groove portions.

After recording was continuously conducted at a pit length of 0.10 μm and a pit interval of 0.10 μm on the land surfaces of the magneto-optical disk thus obtained by an ordinary magnetic field modulation system, reproduction was conducted using the "Method of Enlarging/Reproducing Magnetic Domain by Domain Wall Displacement Utilizing Temperature Gradient of Magnetic Layer" like Example 3-1. As a result, a C/N of 37.0 dB was obtained in an optical system (relative velocity: 2 m/s) having a wavelength of 680 nm and an NA of 0.6.

More specifically, when the polycarbonate substrate 311 of the above-described form was used, the magnetic layer was magnetically divided by tracks without conducting an annealing treatment or the like to easily realize the reproduction of the magneto-optical medium of the domain wall displacement type. Since such a polycarbonate substrate 311 can be formed using a general-purpose substrate-forming technique, it is avoidable to increase the cost of the medium, and so the high-density recording medium can be provided at low cost.

COMPARATIVE EXAMPLE 3-2

An experiment was conducted in the same manner as in Example 3-1 except that a substrate the surface roughness Ra of the surfaces of the groove portions 318 of which was controlled to 1.115 nm was used.

After isolated magnetic domains of 0.25 μm were recorded on the magneto-optical disk thus obtained by a magnetic field modulation system, a light beam for heating was applied to the disk to observe the magnetic domains through a polarization microscope. As a result, open magnetic domains were observed in both land portions and groove portions.

After recording was continuously conducted at a pit length of 0.10 μm and a pit interval of 0.10 μm on the land surfaces of the magneto-optical disk thus obtained by an ordinary magnetic field modulation system, reproduction was conducted using the "Method of Enlarging/Reproducing Magnetic Domain by Domain Wall Displacement Utilizing Temperature Gradient of Magnetic Layer" like Example 3-1. As a result, the reproduction signals were extremely small, and only a C/N of 33.0 dB was obtained in an optical system (relative velocity: 2 m/s) having a wavelength of 680 nm and an NA of 0.6.

A recording-reproducing experiment was also conducted on the groove surfaces under the same conditions as described above. As a result, the reproduction signals became still smaller and were 30.0 dB or smaller in terms of a C/N.

As described above, when the polycarbonate substrate of the above described form was used, the domain wall displacement was extremely hard to occur because the magnetic layer was not magnetically divided, and so no practicable reproduction signal was obtained.

According to the magneto-optical media according to the third embodiment of the present invention, as described above, the magnetic division of the magnetic layer into tracks, which is essential for the formation of the magneto-optical medium disclosed in Japanese Patent Application Laid-Open No. 6-290496 (in which recording density and transfer speed can be greatly improved by the method of enlarging/reproducing a magnetic domain by domain wall displacement utilizing a temperature gradient of a magnetic layer), can be achieved by the simple method of controlling the surface profile (surface roughness) of land or groove portions of a substrate, and moreover magneto-optical media suitable for ultrahigh-density recording can be provided at low cost.

What is claimed is:

1. A magneto-optical medium wherein information recorded therein is reproduced by displacing a domain wall, the medium comprising:

a substrate, and a magnetic layer provided on the substrate, said magnetic layer performing of magnetic domain amplification by magnetic domain wall displacement, wherein the surface roughness Ra of the substrate is 1.2 nm or smaller.

2. The magneto-optical medium according to claim 1, wherein land portions and groove portions are alternately formed in the substrate.

3. The magneto-optical medium according to claim 2, wherein the surface roughness Ra of each slanting side of the land portions is 1.2 nm or smaller.

4. The magneto-optical medium according to claim 2, wherein the surface roughness Ra of each top of the land portions is 1.2 nm or smaller.

5. The magneto-optical medium according to claim 1, wherein the surface roughness Ra of the substrate is 0.6 nm or smaller.

6. The magneto-optical medium according to claim 3, wherein the angle of the slanting side is from 40 to 90 degrees.

7. A magneto-optical medium wherein information recorded therein is reproduced by displacing a domain wall, the medium comprising:

a substrate in which land portions and groove portions are alternately present and a magnetic layer provided on the substrate, said magnetic layer performing magnetic domain amplification by magnetic domain wall displacement, wherein the surface roughness Ra of one of the land portions and the groove portions is 1.2 nm or greater.

8. The medium according to claim 7, wherein the magnetic layer is magnetically divided by the land portions or groove portions having said surface roughness.

9. The medium according to claim 1, wherein the magnetic layer comprises a first magnetic layer in which a domain wall of a magnetic domain formed is displaced, a third magnetic layer in which information is stored, and a second magnetic layer located between the first magnetic layer and the third magnetic layer and having a Curie temperature lower than the first and third magnetic layers.

10. The medium according to claim 7, wherein the magnetic layer comprises a first magnetic layer in which a domain wall of a magnetic domain formed is displaced, a third magnetic layer in which information is stored, and a second magnetic layer located between the first magnetic layer and the third magnetic layer and having a Curie temperature lower than the first and third magnetic layers.

* * * * *